United States Patent
Shih et al.

(10) Patent No.: US 7,727,607 B2
(45) Date of Patent: *Jun. 1, 2010

(54) MULTI-LAYER DRY PAINT DECORATIVE LAMINATE HAVING DISCOLORATION PREVENTION BARRIER

(75) Inventors: Frank Yen-Jer Shih, Arcadia, CA (US); Roger A. Fahlsing, Hobart, IN (US); Anneke Margaret Kaminski, Cincinnati, OH (US); John Vincent Fontana, Cincinnati, OH (US); Douglas Bruce Zeik, Middletown, OH (US); Martin Ian James, Montesilvano Colle (IT)

(73) Assignee: The Procter & Gamble Company, Cincinnati, OH (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/707,353

(22) Filed: Feb. 16, 2007

(65) Prior Publication Data
US 2007/0154671 A1 Jul. 5, 2007

Related U.S. Application Data

(63) Continuation of application No. 10/982,758, filed on Nov. 5, 2004, now abandoned, which is a continuation-in-part of application No. 10/779,528, filed on Feb. 13, 2004, now abandoned, which is a continuation-in-part of application No. 10/457,826, filed on Jun. 9, 2003, now Pat. No. 7,132,142.

(51) Int. Cl.
*B32B 9/00* (2006.01)
*B32B 33/00* (2006.01)
*B32B 7/12* (2006.01)
*B32B 15/04* (2006.01)

(52) U.S. Cl. ............... 428/40.1; 428/40.2; 428/41.6; 428/42.1; 428/343; 428/354; 428/904

(58) Field of Classification Search ........... 428/40.1, 428/40.2, 41.5, 41.6, 41.8, 42.1, 141, 202, 428/204, 343, 352, 354, 904.4, 906
See application file for complete search history.

(56) References Cited

U.S. PATENT DOCUMENTS 1,365,715 A 1/1921 Morrison (Continued)

FOREIGN PATENT DOCUMENTS

CA 2515760 A1 9/2004

(Continued)

OTHER PUBLICATIONS

Millikin & Company, "180 Walls", Jul. 18, 2006, Milliken & Company website www.180walls.com, home page, pages showing different patterns, and Frequently Asked Questions pages, 26 pages.

(Continued)

*Primary Examiner*—Patricia L Nordmeyer
(74) *Attorney, Agent, or Firm*—Jeffrey V Bamber

(57) ABSTRACT

A decorative dry paint wall film includes a layer of dry paint, a pressure-sensitive adhesive layer on one side of the dry paint layer, and a release liner in releasable contact with the dry paint layer on a side opposite from the pressure-sensitive adhesive (PSA). The release liner has a matte release coat layer that contacts the dry paint layer. The release liner is released from the dry paint layer after the PSA side is attached to a wall. The matte release coat transfers a matte finish to the dry paint layer when the release liner is removed. The wall film includes a barrier layer to protect against significant discoloration of the color in the dry paint layer caused by migration of azo-type pigments from a painted wall surface. The barrier layer in one embodiment comprises a dry emulsion containing ethylene-vinyl alcohol and a dispersed polymeric material which in one embodiment comprises a urethane material.

25 Claims, 2 Drawing Sheets

U.S. PATENT DOCUMENTS

| | | |
|---|---|---|
| 2,746,893 A | 5/1956 | Matthes |
| 3,152,030 A | 10/1964 | Sampson |
| 3,301,741 A | 1/1967 | Henrickson et al. |
| 3,314,838 A | 4/1967 | Erwin |
| 3,331,729 A | 7/1967 | Danielson et al. |
| 3,616,192 A | 10/1971 | Sinclair |
| 3,640,791 A | 2/1972 | Rosenheim |
| 3,654,044 A | 4/1972 | Hirota |
| 3,666,516 A | 5/1972 | Dunning |
| 3,671,236 A | 6/1972 | Van Beusekom |
| 3,741,786 A | 6/1973 | Torrey |
| 3,743,086 A | 7/1973 | Aldrich |
| 3,804,700 A | 4/1974 | Hoey |
| 3,896,249 A | 7/1975 | Keeling et al. |
| 3,900,644 A | 8/1975 | Sackoff et al. |
| 3,900,645 A | 8/1975 | Morgan |
| 3,916,046 A | 10/1975 | Youngberg |
| 3,933,702 A | 1/1976 | Caimi et al. |
| 4,037,008 A | 7/1977 | Tugwell |
| 4,054,697 A | 10/1977 | Reed et al. |
| 4,068,033 A | 1/1978 | Meade |
| 4,094,690 A | 6/1978 | Morton |
| 4,151,319 A | 4/1979 | Sackoff et al. |
| 4,175,156 A | 11/1979 | Ikins |
| 4,205,107 A | 5/1980 | Jaschke et al. |
| 4,210,485 A | 7/1980 | Lake |
| 4,232,077 A | 11/1980 | Meisel |
| 4,235,657 A | 11/1980 | Greenman et al. |
| 4,241,129 A | 12/1980 | Marton et al. |
| 4,248,762 A | 2/1981 | Hornibrook et al. |
| 4,248,917 A | 2/1981 | Hornibrook et al. |
| 4,256,794 A | 3/1981 | Meisel |
| 4,258,096 A | 3/1981 | LaMarche |
| 4,262,051 A | 4/1981 | Welz et al. |
| 4,298,647 A | 11/1981 | Cancio et al. |
| 4,369,157 A | 1/1983 | Conner |
| 4,376,151 A | 3/1983 | Parrotta |
| 4,376,159 A | 3/1983 | Spechler |
| 4,377,050 A | 3/1983 | Renholts |
| 4,451,522 A | 5/1984 | de Vroon |
| 4,499,130 A | 2/1985 | Questel et al. |
| 4,514,457 A | 4/1985 | Sasaki |
| 4,517,044 A | 5/1985 | Arnold |
| 4,524,097 A | 6/1985 | Graham |
| 4,550,683 A | 11/1985 | Jones |
| 4,555,441 A | 11/1985 | Rothenberg |
| 4,555,471 A | 11/1985 | Barzynski et al. |
| 4,556,595 A | 12/1985 | Ochi |
| 4,560,587 A | 12/1985 | Sasaki |
| 4,564,406 A | 1/1986 | Binks |
| 4,598,020 A | 7/1986 | Panush |
| 4,650,704 A | 3/1987 | Rothenberg |
| 4,661,182 A | 4/1987 | Lerner |
| 4,737,225 A | 4/1988 | Waugh et al. |
| 4,748,151 A | 5/1988 | Murata et al. |
| 4,759,441 A | 7/1988 | Leurck |
| 4,783,354 A | 11/1988 | Fagan |
| 4,786,537 A | 11/1988 | Sasaki |
| 4,818,589 A | 4/1989 | Johnson et al. |
| 4,854,610 A | 8/1989 | Kwiatek |
| 4,871,618 A | 10/1989 | Kinneberg et al. |
| 4,888,244 A | 12/1989 | Masubuchi et al. |
| 4,894,274 A | 1/1990 | Graham et al. |
| 4,902,557 A | 2/1990 | Rohrbacher |
| 4,919,994 A | 4/1990 | Incremona et al. |
| 4,985,395 A | 1/1991 | Vanmaele et al. |
| 4,999,076 A | 3/1991 | Incremona et al. |
| 5,000,810 A | 3/1991 | Silverstein |
| 5,034,269 A | 7/1991 | Wheeler |
| 5,045,569 A | 9/1991 | Delgado |
| 5,073,422 A | 12/1991 | Konno et al. |
| 5,073,457 A | 12/1991 | Blackwell |
| 5,075,149 A | 12/1991 | Owens et al. |
| 5,084,317 A | 1/1992 | Epple |
| 5,114,514 A | 5/1992 | Landis |
| 5,130,293 A | 7/1992 | Saito et al. |
| 5,134,012 A | 7/1992 | Arakawa et al. |
| 5,135,798 A | 8/1992 | Muschter et al. |
| 5,141,584 A | 8/1992 | Schuh et al. |
| 5,141,790 A | 8/1992 | Calhoun et al. |
| 5,169,474 A | 12/1992 | Binder |
| 5,183,696 A | 2/1993 | Sanderson |
| 5,192,612 A | 3/1993 | Otter et al. |
| 5,196,246 A | 3/1993 | Kauss et al. |
| 5,198,301 A | 3/1993 | Hager et al. |
| 5,203,941 A | 4/1993 | Spain et al. |
| 5,215,826 A | 6/1993 | Shimanski et al. |
| 5,229,207 A | 7/1993 | Paquette et al. |
| 5,250,336 A | 10/1993 | Greuse et al. |
| 5,266,372 A | 11/1993 | Arakawa et al. |
| 5,308,694 A | 5/1994 | Andersson |
| 5,316,843 A | 5/1994 | Kiryu et al. |
| 5,322,708 A | 6/1994 | Eissele |
| 5,342,666 A | 8/1994 | Ellison et al. |
| 5,342,821 A | 8/1994 | Pearce |
| 5,346,766 A | 9/1994 | Otter et al. |
| 5,413,829 A | 5/1995 | Brown et al. |
| 5,430,904 A | 7/1995 | Ono et al. |
| 5,441,784 A | 8/1995 | Smith |
| 5,451,440 A | 9/1995 | Tynan, Jr. |
| 5,460,855 A | 10/1995 | Andersson |
| 5,468,532 A | 11/1995 | Ho et al. |
| 5,476,901 A | 12/1995 | Smith et al. |
| 5,482,182 A | 1/1996 | Thompson et al. |
| 5,487,929 A | 1/1996 | Rusincovitch, Jr. et al. |
| 5,489,359 A | 2/1996 | Yamane |
| 5,490,893 A | 2/1996 | Enlow et al. |
| 5,498,305 A | 3/1996 | Mailloux |
| 5,506,031 A | 4/1996 | Spain et al. |
| 5,518,786 A | 5/1996 | Johnson et al. |
| 5,523,129 A | 6/1996 | McGeehan-Hatch |
| 5,571,557 A | 11/1996 | De Bastiani et al. |
| 5,573,865 A | 11/1996 | Steelman et al. |
| 5,591,290 A | 1/1997 | Walter et al. |
| 5,591,513 A | 1/1997 | Mahling |
| 5,595,626 A | 1/1997 | Yokouchi et al. |
| 5,620,772 A | 4/1997 | Taniguchi |
| 5,633,078 A | 5/1997 | Kamiyama |
| 5,633,225 A | 5/1997 | Fredj et al. |
| 5,639,539 A | 6/1997 | DeProspero et al. |
| 5,641,835 A | 6/1997 | Smith et al. |
| 5,643,668 A | 7/1997 | Calhoun et al. |
| 5,658,646 A | 8/1997 | Takano et al. |
| 5,662,977 A | 9/1997 | Spain et al. |
| 5,665,458 A | 9/1997 | Mahn, Jr. |
| 5,670,014 A | 9/1997 | Mendelovich et al. |
| 5,676,787 A | 10/1997 | Rusincovitch et al. |
| 5,681,631 A | 10/1997 | Steelman et al. |
| 5,683,805 A | 11/1997 | Oita et al. |
| 5,707,482 A | 1/1998 | Fusselman |
| 5,707,697 A | 1/1998 | Spain et al. |
| 5,725,712 A | 3/1998 | Spain et al. |
| 5,728,469 A | 3/1998 | Mann et al. |
| 5,741,620 A | 4/1998 | Holmes et al. |
| 5,750,234 A | 5/1998 | Johnson et al. |
| 5,750,254 A | 5/1998 | Starkey |
| 5,773,112 A | 6/1998 | Tachikawa et al. |
| 5,785,790 A | 7/1998 | Olsen et al. |
| 5,788,796 A | 8/1998 | Look et al. |
| 5,795,636 A | 8/1998 | Keller et al. |
| 5,814,402 A | 9/1998 | Smith |
| 5,851,931 A | 12/1998 | DeRenzo et al. |
| 5,852,121 A | 12/1998 | Steelman et al. |
| 5,853,876 A | 12/1998 | Takano et al. |

| | | | | | | |
|---|---|---|---|---|---|---|
| 5,866,220 | A | 2/1999 | Rusincovitch et al. | 6,783,816 B2 | 8/2004 | Golub et al. |
| 5,891,294 | A | 4/1999 | Shih et al. | 6,805,048 B2 | 10/2004 | Pearson et al. |
| 5,897,742 | A | 4/1999 | Semmler | 6,808,586 B1 | 10/2004 | Steinhardt |
| 5,904,968 | A | 5/1999 | Langan | 6,824,638 B1 | 11/2004 | Anderson et al. |
| 5,906,883 | A | 5/1999 | Blanc-Brude | 6,866,383 B2 | 3/2005 | Naik et al. |
| 5,916,643 | A | 6/1999 | Spain et al. | 6,872,268 B2 | 3/2005 | David et al. |
| 5,919,537 | A | 7/1999 | Niazy | 6,875,800 B2 | 4/2005 | Vanier et al. |
| 5,939,479 | A | 8/1999 | Reaves et al. | 6,916,532 B2 | 7/2005 | Yanagiuchi |
| 5,955,204 | A | 9/1999 | Yamamoto et al. | 6,929,846 B2 | 8/2005 | Kamiyama |
| 5,985,079 | A | 11/1999 | Ellison | 6,955,124 B2 | 10/2005 | Ciaramitaro et al. |
| 5,989,707 | A | 11/1999 | Takizawa et al. | 6,984,429 B2 | 1/2006 | Thunhorst et al. |
| 6,020,062 | A | 2/2000 | Questel et al. | 7,132,142 B2 | 11/2006 | Truog et al. |
| 6,042,678 | A | 3/2000 | Johnson | 7,141,133 B2 | 11/2006 | Kesti et al. |
| 6,083,616 | A | 7/2000 | Dressler | 2001/0006714 A1 | 7/2001 | Bull et al. |
| 6,086,995 | A | 7/2000 | Smith | 2002/0127361 A1 | 9/2002 | Sandt et al. |
| 6,096,396 | A | 8/2000 | Patton et al. | 2002/0142155 A1 | 10/2002 | Steinberg |
| 6,129,965 | A | 10/2000 | Langan | 2002/0182955 A1 | 12/2002 | Weglewski et al. |
| 6,153,283 | A | 11/2000 | Pierson et al. | 2002/0197398 A1 | 12/2002 | Scholz et al. |
| 6,193,918 | B1 | 2/2001 | McGuir et al. | 2003/0026932 A1 | 2/2003 | Johnson et al. |
| 6,194,064 | B1 | 2/2001 | Keely et al. | 2003/0116265 A1 | 6/2003 | Anderson et al. |
| 6,214,453 | B1 | 4/2001 | Kano | 2003/0134114 A1 | 7/2003 | Pallotta et al. |
| 6,214,485 | B1 | 4/2001 | Barnett et al. | 2003/0150547 A1 | 8/2003 | Kesti et al. |
| 6,221,198 | B1 | 4/2001 | Gryska et al. | 2003/0157287 A1 | 8/2003 | Song |
| 6,221,485 | B1 | 4/2001 | Sanchez et al. | 2003/0211334 A1 | 11/2003 | Jones |
| 6,228,486 | B1 | 5/2001 | Kittel et al. | 2004/0076788 A1 | 4/2004 | Steinhardt et al. |
| 6,235,363 | B1 | 5/2001 | Bilodeau | 2004/0101647 A1 | 5/2004 | Pitzen |
| 6,248,427 | B1 | 6/2001 | Ast | 2004/0126529 A1 | 7/2004 | Squier et al. |
| 6,296,732 | B1 | 10/2001 | Enlow et al. | 2004/0159969 A1 | 8/2004 | Truog et al. |
| 6,311,399 | B1 | 11/2001 | Steelman et al. | 2004/0161564 A1 | 8/2004 | Truog |
| 6,312,777 | B1 | 11/2001 | Smith | 2004/0161566 A1 | 8/2004 | Truog et al. |
| 6,322,874 | B1 | 11/2001 | Steelman et al. | 2004/0161567 A1 | 8/2004 | Truog et al. |
| 6,324,811 | B1 | 12/2001 | Gauss et al. | 2004/0161568 A1 | 8/2004 | Truog et al. |
| 6,336,988 | B1 | 1/2002 | Enlow et al. | 2004/0170855 A1 | 9/2004 | Kawabata |
| 6,349,754 | B1 | 2/2002 | Johnson | 2004/0200564 A1 | 10/2004 | Kinsey et al. |
| 6,352,769 | B1 | 3/2002 | Mori | 2004/0247837 A1 | 12/2004 | Enlow et al. |
| 6,364,992 | B1 | 4/2002 | Nambu et al. | 2004/0253421 A1 | 12/2004 | Truog et al. |
| 6,376,058 | B1 | 4/2002 | Schut et al. | 2004/0253422 A1 | 12/2004 | Truog et al. |
| 6,379,791 | B1 | 4/2002 | Cernohous et al. | 2004/0253423 A1 | 12/2004 | Truog et al. |
| 6,383,613 | B1 | 5/2002 | Takeda | 2005/0003129 A1 | 1/2005 | Truog et al. |
| 6,394,165 | B1 | 5/2002 | Rader | 2005/0092420 A1 | 5/2005 | Kinne et al. |
| 6,399,193 | B1 | 6/2002 | Ellison | 2005/0175818 A1 | 8/2005 | Kawabata et al. |
| 6,413,630 | B1 | 7/2002 | Nakayama | 2005/0196607 A1 | 9/2005 | Shih et al. |
| 6,421,052 | B1 | 7/2002 | McGuire | 2005/0255271 A1 | 11/2005 | Brimo |
| 6,432,241 | B1 | 8/2002 | Congard et al. | 2006/0003114 A1 | 1/2006 | Enlow et al. |
| 6,432,528 | B1 | 8/2002 | Faust et al. | 2006/0029765 A1 | 2/2006 | Truog et al. |
| 6,447,630 | B1 | 9/2002 | Disano et al. | 2006/0046027 A1 | 3/2006 | Kaminski et al. |
| 6,461,422 | B1 | 10/2002 | Yang et al. | 2006/0046028 A1 | 3/2006 | Kaminski et al. |
| 6,474,389 | B1 | 11/2002 | Steelman et al. | 2006/0046083 A1 | 3/2006 | Steinhardt et al. |
| 6,475,616 | B1 | 11/2002 | Dietz et al. | 2006/0051571 A1 | 3/2006 | Steinhardt et al. |
| 6,482,488 | B1 | 11/2002 | Janssen et al. | 2006/0073318 A1 | 4/2006 | Tuttle et al. |
| 6,482,638 | B1 | 11/2002 | Patil et al. | 2006/0088695 A1 | 4/2006 | Coburn |
| 6,493,918 | B1 | 12/2002 | Bell et al. | 2006/0093776 A1 | 5/2006 | Crum |
| 6,509,075 | B1 | 1/2003 | McCurry et al. | 2006/0165979 A1 | 7/2006 | Kinsey et al. |
| 6,514,624 | B2 | 2/2003 | Takemoto | 2007/0092678 A1 | 4/2007 | Truog et al. |
| 6,520,234 | B1 | 2/2003 | Anderson et al. | 2007/0092679 A1 | 4/2007 | Truog et al. |
| 6,541,109 | B1 | 4/2003 | Kumar et al. | 2007/0098943 A1 | 5/2007 | Truog et al. |
| 6,554,044 | B2 | 4/2003 | Paulson et al. | | | |
| 6,576,327 | B1 | 6/2003 | Weissmann et al. | | FOREIGN PATENT DOCUMENTS | |
| 6,579,601 | B2 | 6/2003 | Kollaja et al. | | | |
| 6,613,181 | B2 | 9/2003 | Steelman et al. | CA | 2515764 A1 | 9/2004 |
| 6,613,411 | B2 | 9/2003 | Kollaja et al. | DE | 22 54 430 | 5/1974 |
| 6,617,008 | B1 | 9/2003 | Kono et al. | DE | 35 43 777 A1 | 6/1987 |
| 6,630,049 | B2 | 10/2003 | Hannington et al. | DE | 197 35 958 A1 | 2/1999 |
| 6,645,328 | B2 | 11/2003 | Anderson et al. | DE | 198 37 774 A1 | 2/2000 |
| 6,649,003 | B1 | 11/2003 | Spain et al. | EP | 0 032 258 A1 | 7/1981 |
| 6,649,682 | B1 | 11/2003 | Breton et al. | EP | 0 103 344 B1 | 3/1984 |
| 6,703,089 | B2 | 3/2004 | DeProspero | EP | 0 103 407 A1 | 3/1984 |
| 6,706,131 | B2 | 3/2004 | Steelman et al. | EP | 0 216 230 A2 | 4/1987 |
| 6,709,723 | B2 | 3/2004 | Roys et al. | EP | 0 233 633 B1 | 8/1987 |
| 6,723,427 | B1 | 4/2004 | Johnson et al. | EP | 0 238 301 A1 | 9/1987 |
| 6,740,379 | B1 | 5/2004 | Congard et al. | EP | 0 266 224 B1 | 5/1988 |
| 6,756,095 | B2 | 6/2004 | Sandt et al. | EP | 0 381 349 B1 | 8/1990 |
| 6,773,653 | B2 | 8/2004 | Miller et al. | EP | 0 384 252 B1 | 8/1990 |

| | | |
|---|---|---|
| EP | 0 395 814 A2 | 11/1990 |
| EP | 0 473 254 B1 | 3/1992 |
| EP | 0 480 892 A1 | 4/1992 |
| EP | 0 487 724 B1 | 6/1992 |
| EP | 0 561 086 A | 9/1993 |
| EP | 0 569 921 B1 | 11/1993 |
| EP | 0 578 957 B1 | 1/1994 |
| EP | 0 619 184 B1 | 10/1994 |
| EP | 0 623 477 A2 | 11/1994 |
| EP | 0 638 019 B1 | 2/1995 |
| EP | 0 658 175 B1 | 6/1995 |
| EP | 0 695 629 A2 | 2/1996 |
| EP | 0 752 498 B1 | 1/1997 |
| EP | 0 794 522 B1 | 9/1997 |
| EP | 0 803 351 A1 | 10/1997 |
| EP | 0 893 247 A1 | 1/1999 |
| EP | 0 992 361 B1 | 4/2000 |
| EP | 0 993 876 B1 | 4/2000 |
| EP | 1 018 533 B1 | 7/2000 |
| EP | 1 023 169 B1 | 8/2000 |
| EP | 1 034 090 B1 | 9/2000 |
| EP | 1 038 665 A1 | 9/2000 |
| EP | 1 047 556 B1 | 11/2000 |
| EP | 1 053 793 B1 | 11/2000 |
| EP | 1 055 514 B1 | 11/2000 |
| EP | 1 093 911 A2 | 4/2001 |
| EP | 1 169 180 B1 | 1/2002 |
| EP | 1 201 422 B1 | 5/2002 |
| EP | 1 203 968 A1 | 5/2002 |
| EP | 1 226 958 A1 | 7/2002 |
| EP | 1 318 011 B1 | 6/2003 |
| EP | 1 342 565 B1 | 9/2003 |
| EP | 1 377 646 B1 | 1/2004 |
| EP | 1 462 423 A1 | 9/2004 |
| EP | 1 518 716 A1 | 3/2005 |
| GB | 967405 | 8/1964 |
| GB | 1 232 971 | 5/1971 |
| JP | 49039997 A | 4/1974 |
| JP | 03080557 A | 4/1991 |
| JP | 04008785 A | 1/1992 |
| JP | 08/034959 | 2/1996 |
| JP | 08058033 A | 3/1996 |
| JP | 09041617 A | 2/1997 |
| JP | 10-016498 B1 | 1/1998 |
| JP | 10/278187 | 10/1998 |
| JP | 11293123 | 10/1999 |
| JP | 2001227132 | 8/2001 |
| JP | 2001295425 | 10/2001 |
| JP | 2001310953 | 11/2001 |
| JP | 2002067243 | 3/2002 |
| JP | 2002113995 | 4/2002 |
| JP | 2003-025793 B1 | 1/2003 |
| JP | 2005-206724 A | 8/2005 |
| JP | 2005-220337 A | 8/2005 |
| WO | WO 90/00788 A1 | 1/1990 |
| WO | WO 92/13712 A1 | 8/1992 |
| WO | WO 94/03337 A2 | 2/1994 |
| WO | WO 94/09983 A1 | 5/1994 |
| WO | WO 95/17312 A1 | 6/1995 |
| WO | WO 99/19149 A1 | 4/1999 |
| WO | WO 99/37479 A1 | 7/1999 |
| WO | WO 99/64235 A1 | 12/1999 |
| WO | WO 00/01527 A1 | 1/2000 |
| WO | WO 00/50234 | 8/2000 |
| WO | WO 00/56556 A1 | 9/2000 |
| WO | WO 01/00411 A1 | 1/2001 |
| WO | WO 01/79372 A2 | 10/2001 |
| WO | WO 03/053719 A2 | 7/2003 |
| WO | WO 03/062341 A2 | 7/2003 |
| WO | WO 03/066761 A2 | 8/2003 |
| WO | WO 03/095238 A1 | 11/2003 |
| WO | WO 2004/062903 A2 | 7/2004 |
| WO | 2004/074003 | 9/2004 |
| WO | 2004/074004 | 9/2004 |
| WO | 2004/074006 | 9/2004 |
| WO | 2004/074007 | 9/2004 |
| WO | 2004/074008 | 9/2004 |
| WO | 2004/074009 | 9/2004 |
| WO | WO 2004/074007 A2 | 9/2004 |
| WO | WO 2004/074008 A2 | 9/2004 |
| WO | WO 2005/007397 A1 | 1/2005 |
| WO | WO 2005/075591 A1 | 8/2005 |
| WO | 2005/087490 | 9/2005 |
| WO | 2005/087492 | 9/2005 |
| WO | WO 2005/105429 A1 | 11/2005 |
| WO | 2006/052698 | 5/2006 |

OTHER PUBLICATIONS

Fix-It Club, "How to Hang Wallpaper," http://home.howstuffworks.com, copyright 1998-2007, web pages printed Jan. 24, 2007, pp. 1-13, published on the internet by HowStuffWorks.com, c/o The Convex Group, Atlanta, GA, U.S.A.
Author Unknown, Avery Dennison™ "Find a Solution" Architectural film product information from website www.averydennison.com, copyright 1996-2007, web pages printed Feb. 6, 2007, Avery Dennison Corporation, Pasadena, CA U.S.A., 15 pages.
Author Unknown, Di-Noc™ Film Planning Guide, pp. 1-32, http://solutions.3m.com/wps/porta1/3M/en_US/Graphics/Scotchprint/Solutions/Di-NocFilm/Bulletins/, date of publication unknown, Minnesota Mining and Manufacturing Company (3M), St. Paul. MN, U.S.A.
Author Unknown, Di-noc™ Film Product Bulletin D1, pp. 1-5, http://solutions.3m.com/wps/portal/3M/en_US/Graphics/Scotchprint/Solutions/Di-NocFilm/Bulletins/, Aug. 2006, Minnesota Mining and Manufacturing Company (3M), St. Paul, MN, U.S.A.
Author Unknown, "Application of 3M™ Di-Noc™ Films, A Guide for Indoor and Outdoor Dry Applications, Instruction Bulletin 5.41", pp. 1-8, www.3m.com/intl/PH/downloads/Dinoc.pdf, Aug. 2006, Minnesota Mining and Manufacturing Company (3M), St. Paul, MN, U.S.A.
Author Unknown, "Instalacion de DI-NOC", pp. 1-27, http://www.pavimentosonline.com/3M/DINOC/index.htm, first date of publication unknown, downloaded Aug. 7, 2006, Minnesota Mining and Manufacturing Company (3M), St. Paul, MN, U.S.A.
NOPAR International, "Folio Contact: We stick to your ideas!", "Products—FolioContact—FAQ", "Data Sheet Folio Contact Gridded/Squared, imprinted for permanent markers and white for non-permanent markers", NOPAR International GmbH website, www.jet-contact.com, downloaded Mar. 19, 2007, NOPAR International GmbH, Bremen, Germany.
International Search Report and Written Opinion for PCT/US2004/004397, mailed Sep. 10, 2004.
International Preliminary Report on Patentability for PCT/US2005/039890, mailed May 18, 2007.
International Preliminary Report on Patentability for PCT/US2004/004397, date of completion of report Mar. 8, 2005.
International Search Report and Written Opinion for PCT/US2004/004398, mailed Nov. 22, 2004.
International Preliminary Report on Patentability for PCT/US2004/004398, mailed May 12, 2005.
International Search Report and Written Opinion for PCT/US2004/004386, mailed Jul. 21, 2004.
International Preliminary Report on Patentability for PCT/US2004/004386, mailed Sep. 1, 2005.
International Search Report and Written Opinion for PCT/US2004/004396, mailed Sep. 7, 2004.
International Preliminary Report on Patentability for PCT/US2004/004396, mailed Sep. 1, 2005.
Concise Explanation of Relevance of Publications That Are Not in English Language Pursuant to 37 CFR Section 1.98 (3)(i), 2 pages.
Concise Explanation of Non-English Language Publication Under 37 CFR § 1.98(3)(i), 1 page.
Co-Pending and/or Related U.S. Applications and Patents, 4 pages.
U.S. Appl. No. 11/393,506, filed Mar. 30, 2006, Kinsey et al.

U.S. Appl. No. 60/778,832, filed Mar. 3, 2006, Steinhardt et al.
U.S. Appl. No. 60/779,191, filed Mar. 3, 2006, Westendorf et al.
U.S. Appl. No. 60/778,996, filed Mar. 3, 2006, Westendorf et al.
U.S. Appl. No. 11/413,543, filed Apr. 28, 2006, Westendorf et al.
U.S. Appl. No. 11/648,452, filed Dec. 28, 2006, Truog et al.
U.S. Appl. No. 60/848,760, filed Oct. 2, 2006, Zeik et al.
U.S. Appl. No. 60/849,052, filed Oct. 3, 2006, Zeik et al.
U.S. Appl. No. 60/848,739, filed Oct. 2, 2006, Zeik et al.
U.S. Appl. No. 60/849,053, filed Oct. 3, 2006, Zeik et al.

USPTO Office Action dated Mar. 9, 2009 in P&G Case 9536C, U.S. Appl. No. 11/203,840, filed on Aug. 15, 2005, first named inventor Anneke Margaret Kaminski, 8 pgs.
USPTO Office Action dated Sep. 17, 2009 in P&G Case 9536C, U.S. Appl. No. 11/203,840, filed on Aug. 15, 2005, first named inventor Anneke Margaret Kaminski, 9 pgs.
USPTO Office Action dated Jul. 23, 2009 in P&G Case 9537C&L, U.S. Appl. No. 11/204,304, filed on Aug. 15, 2005, first named inventor Anneke Margaret Kaminski, 10 pgs.
Canadian Patent Office Action dated Mar. 19, 2009 in P&G Case 10006R*L, Canadian Patent Application No. 2,579,261.

MULTI-LAYER DRY PAINT DECORATIVE LAMINATE HAVING DISCOLORATION PREVENTION BARRIER

CROSS REFERENCE TO RELATED APPLICATIONS

This application is a continuation of application Ser. No. 10/982,758, filed Nov. 5, 2004, abandoned which is a continuation-in-part of application Ser. No. 10/779,528, filed Feb. 13, 2004, abandoned, and its continuation application Ser. No. 11/638,196, filed Dec. 12, 2006, each of which is a continuation-in-part of application Ser. No. 10/457,826, now U.S. Pat. No. 7,132,142, and Ser. No. 10/457,791, filed Jun. 9, 2003. These applications are incorporated herein in their entirety by this reference.

FIELD OF THE INVENTION

This invention relates to dry paint transfer laminates, and more particularly, to decorative laminates or wall films for applying a layer of color to a wall surface. The wall film of this invention resists discoloration caused by pigments or dyes migrating from a painted wall surface into the color-producing layers of the wall film.

BACKGROUND

Thin sheets of decorative multi-layer dry paint laminates or wall films may be adhesively applied to a painted surface by a bonding layer, typically adhesive, for applying color to the surface. The wall film of this invention provides an alternative to conventional wallpaper. The familiar steps of applying wallpaper paste to conventional wallpaper or immersing pre-pasted wallpaper in water are time consuming, messy and require additional cleanup. These problems are avoided by the wall film of this invention which can be applied and repositioned on the wall in much less time. Special color effects such as faux finishes can be applied in a single application, and the wall film can be applied with overlapping seams that virtually disappear and are, therefore, not noticeable when the wall is viewed even close up and at different angles. The wall film as applied to the wall is exceedingly thin, much thinner than conventional wallpaper, so that by applying the wall film with overlapping seams that are virtually unnoticeable, a room can be decorated with new color effects that speed the process when compared with applying conventional wallpaper.

The wall film of this invention generally comprises a dry paint transfer sheet having one or more decorative layers of dry paint which can include a pigmented dry paint layer or color layer, a transparent protective clear coat layer, and one or more print coats which can provide various visual designs such as a faux pattern, if desired. An adhesive layer such as a pressure sensitive adhesive is applied to the decorative dry paint layer.

The decorative paint layer portion of the wall film preferably comprises a pigmented layer or layers of dry paint that simulate conventional interior wall paint. The wall film can be applied to suitable surfaces, such as flat two-dimensional interior wall surfaces; but the film is sufficiently flexible to be applied to match corners and to fit solidly around curved wall surfaces as well.

Foreign substances or agents in or on the wall surface, such as pigments in a painted surface, may be solubilized (i.e., dissolve) into the bonding layer of the wall film and migrate to the pigmented color-producing layer or layers of the wall film. Discoloration of the wall film may be produced by organic pigments or dyes found in common wall paints that migrate through the bonding layer into the color-producing layers of the wall film. For example, azo-type pigments used in wall paints containing yellow pigments as a component, or to a lesser extent, orange or red pigments or dyes, can migrate and cause discoloration.

The present invention provides a multi-layer wall film adapted for contact with a painted substrate surface that may contain organic materials with color constituents that migrate. The invention addresses a situation, in particular, where the painted surface containing such organic color components may not be modified to avoid the color migration problem. In response to this problem, the invention provides a wall film containing one or more barrier layers that cooperate to block or capture the migrating color materials, and in particular, those containing azo-type pigments. The barrier layer inhibits long-term discoloration of the color layer or layers in the wall film caused by the film being in contact with such a painted surface.

Although a barrier layer may be incorporated into the wall film to inhibit or prevent long-term discoloration of the color-producing layers, addition of the barrier layer should not adversely affect other necessary properties of the wall film. These properties include, but are not limited to, elongation or flexibility, and intercoat adhesion. Coat weight (or dry film thickness) of the barrier layer also is an important criterion inasmuch as the overall thickness of the wall film should stay below a certain level so that the film, in use, can be applied without visibly perceptible seams along overlapping sections of the film.

SUMMARY OF THE INVENTION

Briefly, one embodiment of the invention comprises a multi-layer laminate for providing a layer of color to a painted surface. The laminate includes a decorative dry paint layer and a pressure-sensitive adhesive layer for adhering the laminate to the painted surface. The laminate includes one or more barrier layers that slow or stop migration of discoloration-causing pigments or dyes from the surface, through the adhesive layer, to the color layer of the laminate. In one embodiment, the barrier layer will slow or stop discoloration caused by azo-type pigments in interior latex paint.

One embodiment of the invention comprises a multi-layer decorative wall film having a decorative dry paint layer which includes a color layer of dry paint, a pressure-sensitive adhesive layer on one side of the color layer, and a release liner in releasable contact with the decorative dry paint layer on a side opposite from the pressure-sensitive adhesive. A barrier layer is positioned between the decorative dry paint layer and the pressure-sensitive adhesive layer. The pressure-sensitive adhesive is adapted for adhering the wall film to a substrate surface. The substrate surface can be a painted wall surface containing dyes or pigments that can migrate through the adhesive layer and discolor the dry paint layer. In use, the adhesive layer adheres the wall film to the surface under application of pressure, the release liner is peeled away to expose the dry paint layer, and the barrier layer effectively retards migration of pigments or dyes from the surface to the dry paint layer.

In one embodiment, the barrier layer comprises a thin, flexible layer containing a copolymer of ethylene-vinyl alcohol (EVOH) in a form effective for preventing or appreciably retarding migration of discoloration-causing constituents from the painted surface through the adhesive layer to the color layer. Accelerated aging tests on yellow dye migration have shown substantial improvements in discoloration prevention for various forms of the invention, when compared with similar wall films having no such barrier between a color layer and an adhesive layer. One embodiment of the barrier layer comprises a modified EVOH-based barrier coat in which a polymeric material is blended with an EVOH copolymer to form a stable barrier film that improves barrier properties and other functional properties of the wall film. One embodiment in which the EVOH barrier material is blended with a urethane material improves a number of significant performance properties of the wall film. These include mechanical properties such as elongation and tensile strength and inter-layer adhesion, in addition to providing an improved barrier against migrating discoloration-causing agents. The barrier layer also stabilizes adhesive properties by retarding unwanted constituents migrating from the color coat layer into the adhesive layer.

The barrier layer is particularly useful in retarding transmission of azo-type pigments while present at a low coat weight or film thickness which does not significantly increase the overall thickness of the wall film. Use of the barrier layer provides a means to increase the amount of pigment in the color coat to increase film opacity without loss of flexibility or tensile strength.

These and other aspects of the invention will be more fully understood by referring to the following detailed description and the accompanying drawings.

DETAILED DESCRIPTION

Figure 1:
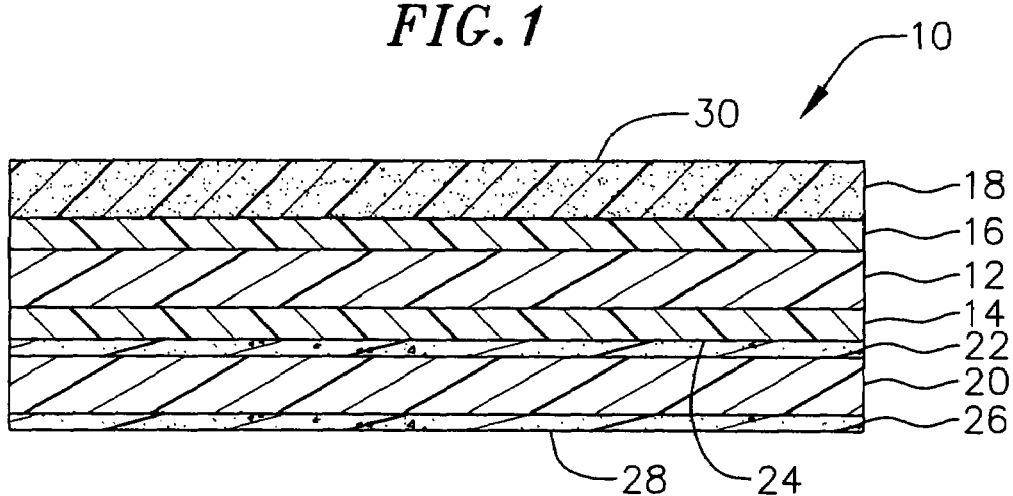
FIG. 1 is a schematic cross-sectional view illustrating one embodiment of a multi-layer dry paint transfer laminate according to principles of this invention.

Referring to FIG. 1, a multilayer dry paint transfer laminate 10, also referred to as a wall film, is adapted for use as a surfacing film. The wall film may be used in applications for providing a layer of color, or special color effects or patterns, to interior wall surfaces. As such, the wall film is adapted to be applied to an interior wall surface under ambient room temperature conditions. Moreover, the wall film is intended to maintain its function of providing the layer of color over an extended useful life of the film, while exposed to such interior ambient room temperature conditions. The layer of color is provided by a flexible protective and decorative dry paint film layer having attributes of abrasion resistance, solvent resistance and opacity similar to conventional wall paints. The wall film also is adapted to be applied directly to painted interior wall surfaces, without the need for special treatment to provide the necessary adhesion of the film to the surface. The wall film in more general terms is adapted for application to architectural surfaces such as walls of buildings, building fixtures or appliances, furniture, and the like. The wall film also can be applied to exterior as well as interior walls of buildings, and it can be applied so as to provide special color treatments such as borders or to sections of interior walls or exterior surfaces.

The wall film comprises one or more decorative layers which include a pigmented dry paint layer 12 comprising a synthetic resinous binder containing a dispersed pigment. The pigmented dry paint layer 12, also referred to herein as a color layer, can be a monocoat pigmented layer, or it can be combined with additional pigmented dry paint layers, coatings or print coats. The decorative portion of the wall film can include an optically transparent synthetic resinous clear coat layer 14 adhered to a surface of the pigmented dry paint layer 12. The clear coat layer provides a protective abrasion-resistant and solvent resistant topcoat for the underlying color layer or layers. These decorative elements of the multilayer dry paint transfer laminate, which may comprise the color layer or layers, print coats and the clear coat layer or layers are referred to herein as a "decorative dry paint layer."

The wall film further includes a flexible polymeric barrier layer 16 according to principles of this invention. The barrier layer 16 overlies and is adhered to the pigmented dry paint layer 12 on a side opposite the clear coat layer 14. A dry pressure-sensitive adhesive layer 18 overlies and is adhered to a side of the barrier layer opposite the decorative dry paint layer. The barrier layer 16 is used to inhibit or prevent undesired migration of constituents between the adhesive layer and the decorative dry paint layer. As mentioned, such barrier properties include reducing or avoiding undesired discoloration by inhibiting or preventing migration of pigments or dyes from a painted substrate surface through the pressure-sensitive adhesive layer to the decorative dry paint layer. Further details of the barrier layer in its various embodiments are described below.

On an opposite side of the wall film, a flexible and foldable release liner 20 overlies and is releasably adhered to the clear coat layer 14. The release liner has a matte release coat 22 on its inner surface for releasably adhering the release liner 20 to a surface 24 of the clear coat layer 14. In use, the release liner 20 is peeled away from the clear coat layer to expose the decorative dry paint layer. The matte release coat 22 separates from the clear coat layer but remains adhered to the release liner 20 when the release liner is peeled away from the rest of the wall film. The release liner 20 also has an adhesive release coat layer 26 on a surface opposite from the decorative layer. An exposed outer surface 28 of the adhesive release coat layer 26 is adapted for releasably contacting an exposed outer surface 30 of the adhesive layer 18 when the laminate is wound in a roll form as illustrated in FIG. 2.

Figure 2:
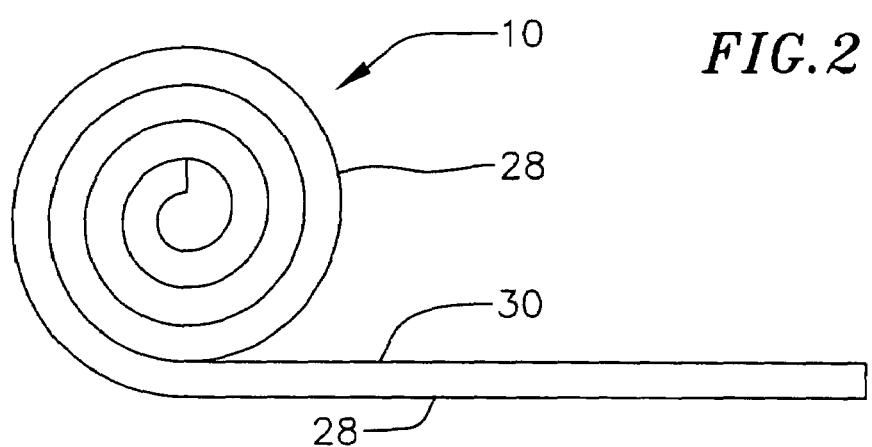
FIG. 2 is a schematic illustration of the dry paint transfer laminate self-wound into a roll form.

Referring to FIG. 2, the wall film 10 is self-wound into a roll form with the outer exposed surface 28 of the adhesive release coat layer 26 in releasable contact with the exposed outer surface 30 of the adhesive layer 18. Thus, when the wall film 10 illustrated in FIG. 2 is unwound, the adhesive release coat layer 26 on the release liner separates from the outer surface 30 of the adhesive layer 18 and remains adhered to the release liner 20. The matte release coat 22 remains adhered to the dry paint layer.

FIG. 1 illustrates one embodiment of a wall film in which opposite sides of the barrier layer 16 are in contact with the adhesive layer 18 and the color layer 12. Other embodiments of the wall film also can be used with a barrier layer according to this invention. These include a multi-layer wall film similar to the FIG. 1 embodiment except that the decorative portion of the wall film may comprise a monocoat pigmented dry paint layer, omitting the clear coat layer. In this instance, the matte release liner transfers a low gloss surface to an exposed outer surface of the monocoat layer. The decorative portion of the laminate also can include one or more decorative dry print coat layers to provide various decorative print patterns between the pigmented dry paint layer and the clear coat layer.

Figure 3:
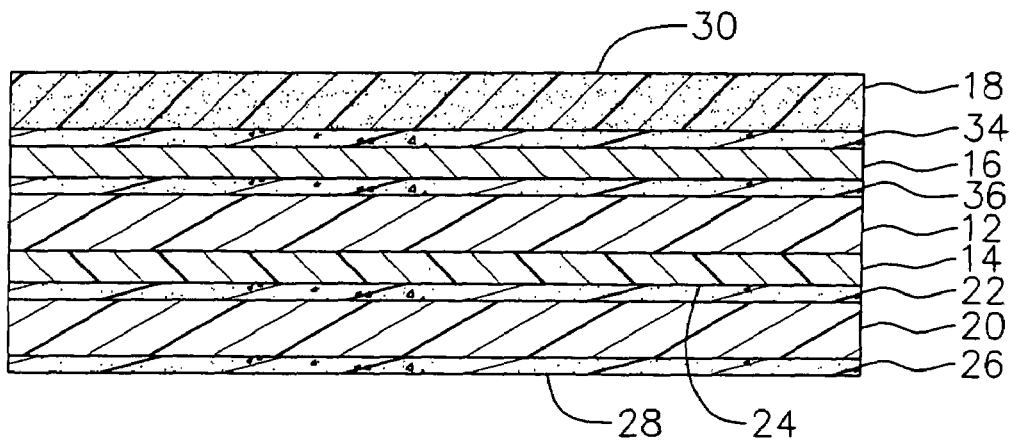
FIG. 3 is a schematic cross-sectional view illustrating an alternative embodiment of the invention.

Certain embodiments of the invention may include one or more thin, flexible polymeric dry adhesive layers or tie coats for improving intercoat adhesion between various overlying layers of the wall film. One such embodiment is illustrated in FIG. 3 in which a first tie coat layer 36 is positioned between the barrier layer 16 and the pigmented dry paint layer 12 and a second tie coat layer 34 is positioned between the barrier layer 16 and the pressure-sensitive adhesive layer 18.

The multi-layer laminate also can include a flexible reinforcing layer (not shown), also referred to as a support layer, between the pigmented dry paint layer and the adhesive layer. In this instance, the barrier layer may be applied between the print coat layer and the reinforcing layer, or the barrier layer may be applied between the adhesive layer and the reinforcing layer. The reinforcing layer can provide a means of structural support for the decorative dry paint layer and can provide additional opacity for the pigmented dry paint layer. The reinforcing layer may also have a tensile strength that exceeds that of the pigmented dry paint layer.

Examples of various embodiments of multi-layer decorative dry paint laminates which can be used with the wall film of this invention are described in more detail in U.S. patent application entitled "Multi-Layer Dry Paint Decorative Laminate Having Discoloration Prevention Barrier," application Ser. No. 10/779,528, filed Feb. 13, 2004, assigned to Avery Dennison Corporation, which is incorporated herein by reference in its entirety.

The portion of the wall film applied to the substrate surface (i.e., the clear coat 14, color layer 12, barrier coat 16 and adhesive layer 18) has a desired low thickness level, to minimize visible seams if adjacent wall films are overlapped during use. The overall film thickness of the wall film as applied to the wall in its finished state (omitting the matte release liner) is preferably less than about 3.0 mils, and more preferably less than about 2.0 mils. In one embodiment, the wall film has a total thickness of less than about 1.6 mils.

The pigmented dry paint layer 12 may have a thickness generally of about 0.5 to about 1.5 mils, in one embodiment about 0.5 to about 1.2 mils, and in another embodiment from about 0.5 to about 0.9 mil. The thickness of the clear coat layer may range generally from about 0.05 to from about 0.4 mil, and in one embodiment from about 0.05 to about 0.3 mil. In one embodiment, the thickness of the flexible decorative dry paint film (clear coat, color layer and optional print coats) is between about 0.6 to about 1.6 mils.

The barrier layer 16, when formed as a discrete layer, may have a thickness of less than about 0.25 mils (approximately 6 microns) as described in more detail below.

The thickness of the adhesive layer 18 may range generally from about 0.4 to about one mil, in one embodiment from about 0.4 to about 0.8 mil, and in another embodiment from about 0.4 to about 0.6 mil.

The thickness of the release liner 20 may range generally from about 0.5 to about 2 mils, in one embodiment from about 0.5 to about 1.5 mils, and in another embodiment from about 0.85 to about 1.05 mils. The thickness of the matte release coat 22 may range generally from about 0.05 to about 0.3 mil, and in one embodiment from about 0.1 to about 0.2 mil.

The thickness of the adhesive release coat layer 26 may range from about 0.04 to about 0.2 mil, in one embodiment from about 0.04 to about 0.15 mil, and in another embodiment from about 0.04 to about 0.08 mil.

Each of the foregoing thicknesses are dry film thicknesses.

Dry Paint Layer and Print Coats

Generally speaking, the paint composition useful in this invention comprises a solid coloring material, i.e., one or more pigments, suspended in a liquid medium and applied to the carrier, followed by drying to a flexible opaque dry paint film that provides a protective and decorative coating to an architectural wall surface, similar to a conventional wall paint.

The pigmented dry paint layer or layers 12 may comprise one or more polymeric binders or resins and one or more pigments uniformly dispersed in the binder or resin. These layers may be made from solvent cast liquid paint compositions comprising the one or more binders or resins. These compositions may be dispersed in water or in one or more organic solvents, and optionally may contain one or more additional additives for controlling processing properties. The pigmented dry paint layer in one embodiment is essentially non-fibrous, and is applied as a thin liquid film coating which dries to a flexible opaque paint film layer. The paint layer may be applied by coating techniques such as roll coating including reverse roll coating, gravure printing including reverse gravure, slot die, and curtain coating. The pigmented dry paint layers, or the clear coat layer, or the barrier layer may each comprise independently one or more extruded layers, including co-extrusion and extrusion coating.

Any binder or resin conventionally used in wall paint formulations may be used. The binder may comprise a thermoplastic or thermosetting resin. Examples of useful binders or resins generally include synthetic latex resins, acrylic, vinyl, polyester, alkyd, butadiene, styrene, urethane and epoxy resins and mixtures thereof. More specifically, the binder or resin may include one or more polystyrenes; polyolefins, including polyethylenes and polypropylenes; polyamides; polyesters; polycarbonates; polyvinylidene fluoride; polyvinyl chloride; polyvinyl alcohol; polyethylene vinyl alcohol; polyurethanes, including aliphatic and aromatic polyurethanes; polyacrylates; polyvinyl acetates; ionomer resins, and mixtures thereof.

The pigment may be any pigment used in making decorative coatings. These include opacifying pigments, such as titanium dioxide and zinc oxide, as well as tinting pigments known in the art. Filler pigments, such as clay, silica, talc, calcium carbonate, kaolin clay and mica, can be added as well in conventional amounts traditionally used in coating and paint formulations.

The solvent may be one or more organic-based solvents or water, or a water-based solution may be used to form an aqueous emulsion with the binder or resin. Water-based solutions include water-alcohol mixtures.

Additional ingredients that may be used include wetting agents; plasticizers; suspension aids; coalescing agents, surfactants, thickeners, thixotropic agents such as silica; water repellent additives such as polysiloxane compounds; fire retardant additives; biocides; bactericides; defoamers; and flow agents.

The pigment concentration for the liquid paint or coating composition used to form the dry paint layers may range from about 10% to about 30% by weight, and in one embodiment from about 13% to about 27% by weight. The binder or resin concentration may range from about 20% to about 40% by weight, and in one embodiment from about 22% to about 37% by weight. The water or organic solvent concentration may range from about 30% to about 70% by weight, and in one embodiment from about 40% to about 60% by weight. Additional ingredients such as wetting agents, suspension agents, etc., may have concentrations up to about 5% by weight. The coating or paint compositions used in making the dry paint layers may have a pigment volume concentration (pigment volume divided by total volume of non volatile components) from about 9% to about 16%. Pigment volume concentration can control the flexibility of the decorative film and its ability to be properly repositioned. Too much pigment can make the film too brittle; a low pigment volume concentration can produce a film which stretches excessively.

Other binder materials, inorganic fillers, adhesion-promoting materials, solvents, additives and processing aids which can be used to form the color layers of the wall film are described in further detail in application Ser. No. 10/779,528, referred to above.

Transparent Clear Coat Layer

The clear coat layer 14 may comprise a single coating layer or multiple coats, and may comprise any of the polymeric binder materials described above for use in the color layer. The clear coat layer also may be formulated from the various solvents referred to above and applied by the casting or coating techniques described above. As mentioned, the clear coat layer also may be extruded. In one embodiment, the clear coat layer can contain a dispersed filler such as silica to lower the gloss of the matte finish on the wall film. The clear coat layer cooperates with the color layer to provide a flexible decorative dry paint film having the protective qualities of abrasion resistance, water or solvent resistance and toughness of conventional paint. The clear coat layer provides enhanced scuff resistance, stain resistance and/or recoatability to the pigmented dry paint layer or layers underlying it. The clear coat material adheres to the release liner, is adapted to release from the release liner during use and provide the necessary level of surface gloss. In one embodiment, the clear coat layer comprises a dry topcoat containing an acrylic resinous material.

Reinforcing Layer

The optional reinforcing layer may be formed from any of the binder or resin materials described above. This layer may be formed from a solution or an emulsion and applied using any of the coating techniques described below. This layer also may be extruded. The reinforcing layer may contain one or more of the above-described pigments to enhance opacity of the wall film.

Pressure-Sensitive Adhesive Layer

The dry adhesive layer 18 may comprise a pressure-sensitive adhesive (PSA) which bonds the decorative laminate to a substrate surface, under applied pressure, at room temperature. In one embodiment, the adhesive layer is a repositionable adhesive, having a low initial tack that allows slight movement of the laminate to allow positioning adjustments prior to forming a more permanent bond. The adhesive has a suppressed initial level of tack at room temperature that allows the laminate to adhere to a substrate surface and be repositioned thereon followed by removal of the matte release liner from the decorative dry paint layer. The adhesive layer undergoes a subsequent buildup of adhesion due to the passage of time sufficient to permanently bond the dry paint layer to the substrate. The adhesive layer is characterized by producing only a limited amount of ooze beyond the borders of the laminate when the laminate is applied to a substrate. ("Ooze" is defined as the flow over time of the adhesive beyond the edge of the laminate structure.) In one embodiment, no ooze is produced.

Generally speaking, the adhesive is selected from the group consisting of: pressure sensitive; water based; water borne; solvent based; ultraviolet and e-beam cured adhesives; hot melt pressure sensitive adhesives; water-based pressure sensitive adhesives; water-borne pressure sensitive adhesives; static adhesives; static adhesives; electrostatic adhesives; and combinations thereof.

In one embodiment of the invention described below, the pressure-sensitive adhesive comprises a cross-linked acrylic resinous material, and more particularly, a cross-linked acrylic emulsion. A particularly useful adhesive material comprises an internally cross-linked acrylic emulsion. High molecular weight acrylic adhesives and externally cross-linked acrylic adhesives also may be used to produce the desired combination of functional properties.

In addition to the acrylic-based adhesive, the pressure-sensitive adhesive may comprise a rubber-based adhesive, vinyl ether adhesive, silicone adhesive, or mixtures thereof. The pressure sensitive adhesive may be applied to the wall film as a hot melt, an organic solvent-based or water-based adhesive.

The adhesive layer also may contain one or more pigments to enhance the opacity of the paint film layers overlying it and permit use of thinner paint film layers to achieve desired levels of opacity. Any of the pigments identified above may be used. Examples include titanium dioxide and carbon black. The pigment volume concentration may range up to about 10%, in one embodiment from about 5% to about 10%, and in another embodiment from about 2% to about 8%.

A pressure sensitive adhesive useful for the wall film has relatively low tack and peel force levels and relatively low room temperature flow properties. Acrylic emulsion PSAs are particularly useful when such PSAs have a level of crosslinking that produces an adhesive material with a relatively high cohesive strength that yields a desirable combination of low tack, peel and flow properties. Examples of useful PSAs in which the level of crosslinking can be appropriately adjusted include acrylic emulsion PSAs such as pure polymer (butyl acrylate or 2-ethyl hexyl acrylate or 2-ethyl hexyl acrylate/butyl acrylate) PSAs or similar pigmented polymer and copolymer materials.

A particularly useful PSA is an internally cross-linked acrylic emulsion PSA such as a non-tackified cross-linked copolymer emulsion of butyl acrylate and 2-ethyl hexyl acrylate. This adhesive is available from Avery Dennison Corporation as product no. S-3506. A pigmented form of this PSA comprises 96.8% S-3506 adhesive resin, 2.87% UCD 1106E titanium dioxide, and 0.33% UCD 1507E carbon black.

Other pressure-sensitive adhesive materials which may be useful in this invention are described in more detail in U.S. application Ser. No. 10/779,528.

Barrier Layer

The barrier layer 16 stops or retards transmission of undesired discoloration-causing pigments to effectively maintain discoloration or color shift of the color layer to within a level which is essentially unnoticeable for a useful life of the wall film. Accelerated aging tests described herein provide objective measurements for defining a reasonable long-term resistance to discoloration under normal use conditions. Normal use conditions under which the decorative film is applied and normally in use are room temperature conditions defined generally as temperatures from about 4° C. (40° F.) to about 35° C. (90° F.), and more particularly from about 15° C. (60° F.) to about 27° C. (80° F.).

To approximate and predict the amount of color shift that may occur during an estimated useful life of the wall film under normal use conditions, film samples are tested by accelerated aging techniques and measured for color shift under those conditions. (Higher temperatures accelerate migration of discoloration-causing constituents.) In one test method, color shift is measured by comparing the color of an interior latex test sample with an interior latex color standard and then subjecting the test sample and the standard to a 60° C. (140°

F.) environment for approximately 400 hours (16 days). In another accelerated aging test, wall films and a test standard are subjected to different temperatures from 40° C. up to 90° C. for about 1,000 hours at each temperature. The test sample is measured for color shift and compared with a standard to determine the amount of color shift.

According to one test, color shift is measured under ASTM E1164, E308 and 805 test procedures. The unit of measure is C.I.E. b* (yellow to blue axis). The change in color, delta b*, is calculated by subtracting the standard b* value from the test sample b* value. Other color shift measurements can be used to determine whether color shift is within a specified range. The color shift measuring techniques are useful in evaluating whether a color shift is acceptably low by measuring the color shift in a blue painted sample caused by migration of yellow color constituents from mono-azo pigments or dyes. In one embodiment, the color shift is considered sufficiently low to be within an acceptable range for wall films of this invention if testing at 60° C. for 400 hours produces a color shift equal to or less than about 0.40 C.I.E. Δb* color units. Tests have shown such a low color shift for the barrier coats of this invention for at least 1,000 hours.

The various test methods described herein have demonstrated that the barrier layer 16 of this invention retards transmission of azo-type color constituents from a painted surface, through a PSA layer, and into the dry paint color layer, when compared with a similar wall film not containing such a barrier layer. Hansa 10G Yellow and Pigment Yellow 74 are examples of azo-type pigments that can migrate through the wall film. Pilot tests have shown that the barrier layer is effective in stopping migration of Hansa 10G Yellow and Pigment Yellow 74 from a painted wall surface to the decorative color layer of the wall film at 90° C. for a minimum of 48 hours, whereas the same wall film without such a barrier will show discoloration virtually immediately under the same conditions.

The barrier layer 16 generally comprises a hydrolyzed copolymer of vinyl acetate and ethylene, and more specifically, ethylene-vinyl alcohol copolymer (EVOH). A barrier layer containing this barrier material is applied in a film form that effectively retards migration of azo-type dyes to within acceptable C.I.E. Δb* standards when subjected to various accelerated aging tests. Such tests have shown that an EVOH containing barrier stops yellow dye migration at a coat weight of 4 gsm for 1,000 hours of testing at 60° C. Such barrier properties show color shift well below 0.40 C.I.E. Δb* color units.

In one form of the invention, the EVOH copolymer barrier material is blended with a thermoplastic polymeric material that provides a modified EVOH-based barrier material having effective barrier properties when the barrier coating is in dry film form. In one embodiment, the EVOH component is blended with a polyurethane material to form a two-phase system. The solids contained in this blended barrier material generally include from about 70% to about 95% by weight EVOH and from about 5% to about 30% by weight thermoplastic urethane. The copolymer of ethylene and vinyl alcohol used in the barrier material is a commercially available material such as Soarnol available from Nippon Goshei Co., Ltd. Soarnol D-2908 is a preferred EVOH material and contains about 29 mol percent ethylene. The generally preferred EVOH copolymer material will have an average ethylene content from about 20 mol percent to about 45 mol percent. In general, the lower ethylene content (higher vinyl alcohol content) in an EVOH copolymer results in a stronger barrier to migration of organics such as azo-type dyes. In one embodiment, it is preferred to use a waterborne polyurethane polymer as the polymeric material blended with the EVOH. The urethane material may comprise an aliphatic polyester thermoplastic urethane such as Sancure 899 available from Noveon. The urethane-based polymeric material blended with the EVOH also can comprise an aromatic polyester thermoplastic urethane material, such as Noveon's Sancure 1511.

The blended EVOH/urethane barrier material is preferably a thermoplastic barrier material, although in other embodiments of the barrier, the EVOH may be modified by adding crosslinking materials to enhance barrier properties. Crosslinking of the barrier material also can improve water/humidity resistance of the EVOH. Optional minor amounts of crosslinking agents may be added, e.g., from about 2% to about 10% polyaziridene crosslinking resin, from about 3% to about 6% melamine-HCHO, or mixtures thereof. Use of the crosslinked barrier material can enhance barrier properties useful in producing the desired resistance to color migration. Crosslinking of the barrier material may reduce elongation and increase tensile strength, but the differences are not considered significant when compared with a thermoplastic (non-crosslinked) barrier material. Low crosslink density is preferred to avoid adversely affecting interlayer adhesion.

The barrier material is processed to yield its film-forming properties by combining the EVOH resinous material with a solvent such as 50% water and 50% isopropyl alcohol (IPA) be weight. A portion of the IPA can be replaced by n-butanol which assists in processing by preventing the barrier film from drying too quickly. Use of the organic solvent, such as IPA, as opposed to using a purely aqueous solvent, improves processing of the EVOH into a stable emulsion barrier film. The solvent containing 50% water/50% IPA yields a barrier coating in which the EVOH/urethane blend comprises about 16% of the total emulsion by weight. This amount of resin solids in the blended material can vary from about 9% to about 24% by weight.

The resulting barrier material can be applied by a coating process, such as die coating or gravure coating. The barrier film is heated and dried to a dry film thickness of preferably below about 6 microns. In one embodiment, a dry film barrier layer comprising a blend of EVOH and a polyurethane material has a dry film thickness from about 2.5 to about 4.5 microns.

The EVOH-based barrier layer of this invention can be made in different forms, including: (1) a barrier material comprising a thermoplastic (non-crosslinked) EVOH-based film, (2) a barrier material in which EVOH is crosslinked by addition crosslinking agents such as those described above, (3) a barrier material comprising EVOH blended with a polymeric material such as the urethane material described above, and (4) a barrier material comprising a blend of EVOH and a polymeric material such as polyurethane in which the EVOH component is crosslinked by added crosslinking agents.

These forms of the EVOH-based barrier layers have been shown to produce improved barrier properties that resist migration of discoloration-causing agents when compared with similar wall films having no such barrier layer. The barrier properties include not only resistance to yellow dye migration through the PSA layer to the color layer, but also resistance to migration of constituents from the pigmented color coat layer to the PSA layer, and resistance to migration of constituents from the PSA layer into the color coat layer. The barrier layer, in particular, may resist migration of constituents such as plasticizers, heat stabilizers solvents, surfactants/dispersants and pigments from the color coat to the PSA layer, and may resist migration of solvents, tackifiers, fillers, plasticizers, antioxidants and pigments from the PSA layer to the color coat layer, for example. Tests have shown improved PSA performance (resistance to weakening of the PSA layer) when using the barrier coat, when compared with a color coat in contact with the PSA layer, i.e., no intervening barrier layer.

The barrier coats consisting primarily of EVOH copolymer generally require tie coats on opposite sides to provide sufficient intercoat adhesion to the color coat and to the PSA. Such adhesive tie coats generally can comprise an acrylic resin such as Elvacite 2042, organic solvents such as MEK and MibK, and a PSA material such as Avery Dennison's AS346OU for a tie coat between the color layer and the barrier layer. A tie coat comprising an Avery Dennison S-3506 PSA can provide a tie coat between the EVOH barrier layer and the PSA layer.

The barrier films made with EVOH blended with a polymeric material such as polyurethane generally maintain good barrier properties while improving interface adhesion to the color coat and PSA. These barrier layers show resistance to yellow dye migration through the wall film when subjected to aging tests conditions over a wide range of elevated temperatures. These improved barrier properties are produced using the thermoplastic EVOH/urethane barrier layer in the absence of tie coats on either side of the barrier layer. The barrier layer itself provides sufficient intercoat adhesion to act as a good tie coat between the PSA and color layers. This improvement in intercoat adhesion can reduce overall wall film thickness by avoiding the added film thickness required by tie coats on either side of the barrier layer. In addition, this barrier layer material provides improved processing in that the barrier layer can be applied in a single pass through a coater, between the color layer and the PSA.

The thermoplastic EVOH/urethane barrier layer also provides improvements in film toughness as demonstrated by increased tensile strength and elongation of the wall film when compared with wall films having no barrier layer and wall films having a barrier made from acrylic-based materials or unmodified EVOH. Enhanced film toughness improves film handling properties including resistance to tearing, flexibility for proper positioning on the wall and around corners, and repositioning of the wall film. Use of the barrier layer in the absence of tie coats on opposite sides also can accommodate more pigment in the color coat without losing flexibility. Added pigment generally can lower film tensile strength, but the modified EVOH barrier material improves film toughness, allowing use of more pigment, thereby improving opacity. Added pigment also can allow for better color matching.

The EVOH and polyurethane materials are blended with solvents to form a stable emulsion which can be formed as a film by die coating or gravure techniques and dried under elevated temperatures. Cross sectional photomicrograph images show that the dispersed polyurethane material migrates to both surfaces of the barrier layer emulsion in dry form, forming boundary layers of the polyurethane material. These boundary or skin layers improve adhesion of the EVOH barrier to the color coat and to the PSA.

The EVOH component of the blended EVOH/urethane material can be crosslinked by minor amounts of crosslinking agents added to the emulsion. Various crosslinking agents have been tested and such crosslinked EVOH/urethane barrier materials provide good resistance to yellow dye migration and can provide sufficient intercoat adhesion without added tie coats. The added crosslinking of the barrier coat material in this instance also can improve certain mechanical properties such as tensile strength, but generally, film toughness and handling are improved more by the thermoplastic form of the EVOH/urethane barrier material.

Polymeric materials other than urethanes may be used to form the modified EVOH barrier layer. Such polymeric materials generally include polyester, ethylene vinyl acetate copolymer (EVA), and acrylic resinous materials. The modifying polymeric materials can be blended with the EVOH to improve certain attributes such as film toughness or intercoat adhesion. These other polymeric materials can be dispersed in the EVOH and form a stable emulsion having barrier properties in dry film form. The barrier properties, as mentioned, may be improved by modifying the EVOH with a migratory polymeric material that may improve interlayer adhesion.

The EVOH barrier layer retards color migration in two ways. Because of its polar nature, the EVOH does not act to compatibilize or solubilize yellow azo-type colorants. The EVOH also is crystalline and so it forms a network that does not allow the yellow azo-type colorant to migrate through the barrier.

The barrier layer is applied at a sufficiently low coat weight to produce a barrier coat having a dry film thickness sufficiently thin so as to not add significant thickness to the decorative portion (excluding the release liner) of the multi-layer laminate. In one embodiment, the wall film with the barrier layer of this invention has a total film thickness (excluding the matte release liner) of less than about 1.9 mils. Film thickness of the barrier layer is preferably not more than about ten percent (10%) of the total thickness of the decorative portion of the film.

The barrier layer is resistant to softening at elevated temperatures, and preferably has a glass transition temperature in excess of 50° C. In one embodiment, the barrier layer has a $T_g$ greater than about 58° C.

The barrier layer has been described generally in its use as a discrete layer between the pigmented base coat layer and the PSA layer. In alternative forms of the invention, the barrier material as described herein may be incorporated into one or more of the other layers of the wall film. For instance, the barrier material may be incorporated into a color layer to provide the barrier properties and other attributes of the barrier layer as described herein.

Matte Release Liner

The release liner may comprise a polymeric film, and including polyolefin, polyester, and combinations thereof. The release liner preferably may be formed from a flexible, foldable, heat-resistant, substantially inelastic, self-supporting temporary carrier film or casting sheet as is known in the art of dry paint transfer films. The release liner is preferably an oriented polyester film such as polyethylene terephthalate (PET) available as Mylar, a trademark of DuPont, or Hoechst Celanese Hostaphan 2000 polyester film, for example.

The release liner provides structural integrity to the wall film until the liner is removed upon application of the wall film to a substrate surface.

The matte release coat layer may comprise any of the above identified binders or resins which provide a level of tack between the release coat layer and the decorative dry paint layer. The tack level is sufficient to prevent separation of the release coat layer from the adhered dry paint layer during the process of forming the wall film and during normal handling, including forming the wall film in its self-wound orientation, unwinding it, and applying it to the substrate surface. The matte release coat also continues to have sufficient release properties to facilitate separation from adhered dry paint layer after applying the wall film to the substrate.

The matte release coating composition is a thermosetting resinous material which, when exposed to heat for drying it, also crosslinks and permanently bonds to the release liner. In one embodiment, the matte release coat formulation includes a primary crosslinking resin such as a melamine resin that controls crosslinking and produces adhesion to the polyester carrier film. A presently preferred crosslinking resin is hexamethoxy methyl resin such as Cymel 303. A suitable primary functional resin is a vinyl resin such as a medium molecular weight vinyl chloride-vinyl acetate resin known as VAGH.

The matte release coat can include a secondary functional resin which can be an acrylic-modified alkyd resin such as Chempol 13 1501 or Lankyd 13-1245. The matte release coat further includes a catalyst for accelerating crosslinking.

The resinous components of the matte release coat composition are combined with a primary resin solvent, such as methyl isobutyl ketone (MibK) and a secondary resin solvent, such as isopropyl alcohol.

The matte release coat is prepared by dissolving the primary functional resin in the primary and secondary resin solvents by mixing and then adding the secondary functional resin and primary matting agent, preferably a filler comprising a fine particulate inert inorganic material, such as aluminum silicate, or talc, or a fine particulate organic filler material. In one embodiment of the matte release coat, the ratio of particulates to resin (or binder) is from about 0.7:1 to about 1.1 to 1.

In use, the matte release layer dries and crosslinks to form a chemical matte coating on the carrier. The gloss of the matte surface is controlled by the amount and particle size of the filler. The fine particles project through the dried exterior surface of the matte release coat, forming a surface with a microroughness that transfers a replicated microroughness to the exposed surface of the dry paint layer.

In one embodiment, a matte release coat formulation useful for this invention contains no significant amount of a silicone-based release material and/or a wax-based component. Such materials may be useful in providing release properties at high temperatures; but the matte release coat of this invention, in one embodiment, comprises a formulation that, in the absence of a silicone-based release material or a wax-based component, provides a useful combination of room temperature release, adherence of the release liner to the dry paint layer, and transfer of the matte surface to the exposed surface of the dry paint layer.

The relative proportions of the components contained in the matte release coat and the related processing conditions for making the release coat and applying it to the release liner are described in further detail in U.S. application Ser. No. 10/799,528, referred to above.

The gloss transferred to the outer surface of the dry paint layer can be controlled by a combination of release coat formulations and the composition of the outer surface layer of dry paint in contact with the release coat. In one embodiment, an 85° gloss of less than about 40 gloss units can be transferred to dry paint films having a monocoat or base coat/clear coat finish comprised of urethane, acrylic and/or vinyl resinous paint layers.

The adhesive release coat layer 28 on the opposite side of the release liner may comprise any release coating composition known in the art. Silicone release coating compositions may be used.

Processing and Use of the Wall Film

The wall film illustrated in FIG. 1 may be made by applying the adhesive release coat to the release liner and then drying and curing it. The dry coat weight of the adhesive release coat layer may be from about 0.1 to about 1.0 gram per square meter (gsm), and in one embodiment, from about 0.25 to about 0.35 gsm. The matte release coat is then applied to the opposite side of the release liner and then dried or cured. The dry coat weight of the matte release coat may be from about 2.5 to about 6.5 gsm, and in one embodiment, from about 4.5 to about 5.5 gsm. The transparent outer clear coat is applied to the matte release coat and then dried or cured prior to application of the pigmented dry paint film layer. The coat weight for the clear coat may be from about 1 to about 5 gsm, and in one embodiment, about 2.5 to about 3.5 gsm. The liquid paint composition for forming the pigmented dry paint layer is then applied to the clear coat layer and then dried or cured. The coat weight for the dry paint layer may range from about 20 to about 60 gsm, and in one embodiment about 30 to about 40 gsm. The barrier coat is then applied to the dry paint layer at a coat weight preferably from about 2.4 gsm to about 6.5 gsm. After the barrier coat is dried, the pressure-sensitive adhesive layer is applied to the dry barrier coat and then dried or cured. The adhesive layer may be applied using coating techniques or transfer lamination. The coat weight of the adhesive layer may range from about 10 to about 30 gsm, and in one embodiment about 11 to about 17 gsm. The dry paint transfer laminate 20 may then be wound into roll form as illustrated in FIG. 2.

The wall film 20 may be used by unrolling it from the roll illustrated in FIG. 2, and simultaneously applying the wall film to the substrate surface to be covered. The substrate may comprise any flat surface. The flat surface may comprise wall board, plastic sheet, metal sheet, composites, and the like. The substrate may comprise an interior (i.e., indoor) wall surface or an exterior (i.e., outdoor) surface. The wall film may be applied to a painted wall surface having various surface finishes, such as flat, eggshell, satin, semi-gloss and high gloss. The wall film is placed over the substrate with the adhesive layer in contact with the substrate. The wall film is particularly suited for applying to a wall under room temperature conditions. Pressure is applied, with repositioning if necessary, until the wall film is adhered to the surface. The release liner is then peeled off the front face of the decorative paint layer, leaving the dry paint layer adhered to the substrate by the adhesive layer. The dry paint layer can be smoothed down on the wall by applied pressure after the release liner is removed.

The release properties of the wall film are controlled by a differential release system in which the release force required to separate the matte release coat from the dry paint layer (which may comprise the transparent layer, the color layer, and/or decorative print coats) is greater than the release force required to separate the adhesive release coat layer from the pressure-sensitive adhesive layer. The adhesive force to the substrate is greater than the force to separate the release liner from the dry paint. The adhesive release forces and unwind release forces of the differential release system are described in greater detail in Application Ser. No. 10/779,528, referred to above.

EXAMPLE 1

A PET liner is coated on one side with a silicone release coating corresponding to the adhesive release coat layer described above. The thickness of the silicone coated liner is 0.92 mil and comprises Mitsubishi 92 gauge SLK.

The matte release coat is applied to the other side of the release liner using gravure at a coat weight of 4.5 to 5.5 gsm. The formulation for the matte release coat is as follows (with all numerical values in parts by weight):

| Component | Parts |
| --- | --- |
| Methyl isobutyl ketone (MibK) | 53.47 |
| Isopropanol | 6.49 |
| Lankyd 13-1245 (product of Akzo Chemical, an acrylic modified alkyd) | 7.21 |
| VAGH (product of Union Carbide, hydroxy modified polyvinyl chloride/polyvinyl acetate copolymer | 8.72 |
| EFKA 5055 (a carboxylic acid ester dispersing agent) | 1.10 |
| Microtalc MP 15-38 (Barretts Minerals) | 23.02 |
| Cymel 303 (Cytec melamine resin) | 7.45 |
| Byk 451 (Byk Chemie blocked acid catalyst) | 3.50 |

In preparing the release coat material the base materials (VAGH, alkyd and talc) are compounded in a 100 part formula. The Cymel 303 and Byk 451 are later blended and after the materials are delivered to the coater the two solutions are blended together. The matte release coat is dried and cured using forced air at a temperature of 149° C.

The matte release coat comprises as its crosslinking resin the melamine (hexamethoxy methyl) resin Cymel 303. The hydroxyl modified polyvinyl chloride/polyvinyl acetate copolymers (VAGH) comprise the primary functional resin and the acrylic modified alkyd comprises a secondary functional resin. The primary crosslinking resin controls crosslinking and bonds to the polyester carrier film. The secondary functional resin modifies release of the dry paint layer (top coat) from the matte release coat. The blocked acid catalyst accelerates the crosslinking process and the talc filler particles control the degree of microroughness of the dry matte release coat.

A transparent clear coat layer is applied to the matte release coat using gravure at a coat weight of 2.6 to 3.0 gsm and dried using forced hot air at a temperature of 165° C. The dry film thickness is 0.09-0.10 mil. The clear coat consists essentially of a thermoplastic acrylic resinous material, preferably polymethyl methacrylate. The formulation for the transparent top coat layer (with all numerical values in parts by weight) is as follows:

| Component | Parts |
| --- | --- |
| Methyl ethyl ketone (MEK) | 40 |
| MibK | 41 |
| Elvacite 2042 (product of Lucite International, polyethyl methacrylate) | 19 |

One or more decorative print coats having printing ink formulations similar to those described in application Ser. No. 10/779,528 are printed over the transparent top coat layer and dried.

The following paint coat composition comprises a plasticized vinyl-based pigmented color coat having an epoxy stabilizer. The paint coat is coated over the decorative print layers, using roll coating at a coat weight of 33.0 to 36.0 gsm and dried in hot air at a temperature of 105° C. to form a color coat layer. The dry film thickness is 0.65 to 0.73 mil. In the following table all numerical values are in parts by weight:

| Component | Parts |
| --- | --- |
| NiPar 820 (product of Angus Chemical, a blend of 80% nitro propane and 20% nitro ethane) | 15.98 |
| Xylene | 23.95 |
| Cyclohexanone | 7.71 |
| VYHH (product of Union Carbide, a vinyl chloride/vinyl acetate copolymer) | 12.76 |
| Edenol 9790 (product of Cognic, a polyester plasticizer) | 6.38 |
| Stanclere T-883 (product of Adchross Chemical, a tin heat stabilizer) | 0.06 |
| EPON 828 (epoxy resin product of Shell) | 0.26 |
| DV 39600 (Gibraltar $TiO_2$ white pigment dispersion) | 32.12 |
| DV 396420 (Gibraltar carbon black pigment dispersion) | 0.23 |
| DV 36500 (Gibraltar red pigment dispersion) | 0.16 |
| DV 34130 (Gibraltar phthalo blue pigment dispersion) | 0.39 |

A barrier coat is prepared by charging a solvent mixture containing 85 gms of water and 85 gms of isopropyl alcohol in a reactor equipped with a mixer and reflux condenser. While mixing, 30 gms Soarnol D-2908 EVOH in pellet form are added to the solvent mixture. The mixture is heated to a temperature of about 80° C. and held for about three to four hours until it becomes a clear solution. The solution is then cooled to room temperature, say about 25° C., and followed by post-adding 21.4 gms of Sancure 899 polyurethane in liquid form for slowly blending with the EVOH under agitation. This produces a two-phase thermoplastic liquid emulsion in which the polyurethane resin is dispersed in the aqueous/isopropynol solution at a solids ratio of about 20 parts urethane to 80 parts EVOH by weight. The coating is applied to the pigmented base coat by coating and then oven drying at 70° C. for about five minutes. The coating is preferably applied by die coating techniques to produce a dry film thickness of about 2.5 to about 4.5 microns.

A pigmented pressure sensitive adhesive layer is then applied to a carrier at a coat weight of 13 to 16 gsm. The dry film thickness of the PSA is from about 0.45 to 0.55 mil. The PSA is then applied to the barrier coat by transfer lamination. The PSA is available from Avery Dennison Corporation under product no. S-3526 and the formulation for the PSA is as follows (with numerical values in parts by weight):

| Component | Parts |
| --- | --- |
| S-3506 (product of Avery Dennison, Performance Polymers, a cross-linked copolymer emulsion of butyl acrylate and 2-ethyl hexyl acrylate) | 96.0 |
| UCD 110GE (white $TiO_2$ pigment dispersion from Rohm and Haas) | 3.7 |
| UCD 1507E (carbon black pigment dispersion from Rohm and Haas) | 0.3 |

The dry film thickness of the decorative laminate of this example is within a preferred range of about 1.30 to about 1.60 mil. In the described example, the dry film thickness of the combined top coat, print coats, color coat, barrier coat and PSA is from 1.35 to 1.51 mil.

EXAMPLE 2

An alternative embodiment of the matte release coat comprises the following formulation in which a dispersing agent is omitted and the catalyst is changed to an unblocked catalyst. (All numerical values are in parts by weight.)

| Component | Parts |
|---|---|
| MibK | 50.54 |
| Isopropanol | 7.84 |
| Lankyd 13-1245 | 8.93 |
| VAGH | 10.68 |
| Microtale MP 15-38 | 22.00 |
| Cymel 303 | 6.80 |
| Cycat 4040 (paratoluene sulfonic acid) | 2.00 |

Adjustments may be made to release properties and gloss in this release coat formulation by optionally adding the following intermediate formulations in which the matte intermediate is used to adjust gloss down and the vehicle intermediate is used to adjust gloss upward.

| Matte Intermediate Component | Parts |
|---|---|
| MibK | 28.05 |
| Lankyd 13-1245 | 4.05 |
| VAGH | 4.90 |
| Dispersing agent | 18.00 |
| Microtale MP 15-38 | 45.00 |

The dispersing agent comprises 10 parts by weight EFKA 5055 and 90 parts by weight MibK.

| Vehicle Intermediate Component | Parts |
|---|---|
| MibK | 64.83 |
| Isopropanol | 13.00 |
| Lankyd 13-1245 | 10.03 |
| VAGH | 12.14 |

EXAMPLE 3

Test panels were prepared and tested for color shift, comparing color shift for: (1) wall films similar to Example 1 containing a barrier coat and (2) similar wall films in the absence of a barrier coat. The test films were applied to a medium yellow (Hansa Yellow 10G and Dalamar Yellow PY74) painted surface and subjected to accelerated aging. The test films were measured for discoloration (color shift) caused by migration of azo-type color constituents that passed from the painted surface through the PSA layer to the color layer of the test sample. The test panels were prepared using a dry paint color layer containing a plasticized vinyl-based paint layer containing a dispersed white pigment. The S-3506 PSA was applied to the color layer. The test panels included a white wall film with 2.5 gsm EVOH/urethane barrier, a white wall film with 6.5 gsm EVOH/urethane barrier, and a white wall film with no barrier layer. The modified EVOH barrier layers were thermoplastic. No tie layers were used for the barrier coats. The EVOH/urethane ratio was 80/20. The medium yellow painted substrate was prepared using Behr 1300 deep base (5 ounces medium yellow per gallon base) applied at 7.5 mils wet coating to 3 mil polyester. The paint coat was allowed to dry for three hours minimum at room temperature then force air dried for five minutes at 250° F. C.I.E. test procedures were used to measure $\Delta b^*$ color change at pre-set time intervals on the test panels exposed to different elevated test temperatures and at room temperature. The instrument used in the tests was Macbeth Color-Eye 7000; illuminant and geometry: D65, 10° observer and specular excluded. These tests yielded the following results:

C.I.E. Delta b* Color Change Per Time at Temperature

| White wall film, 2.5 gsm EVOH/PU barrier | | | | | | |
|---|---|---|---|---|---|---|
| Hrs@Temp | 40 C. | 60 C. | 70 C. | 80 C. | 90 C. | RT |
| 0 | 0 | 0 | 0 | 0 | 0 | 0 |
| 27 | 0 | 0.05 | 0.02 | 0.22 | | |
| 118 | 0.01 | 0.08 | 0.07 | 0.50 | 2.30 | |
| 285 | 0.02 | 0.08 | 0.07 | 0.50 | 2.30 | |
| 454 | 0.01 | 0.10 | 0.29 | 1.15 | 2.93 | |
| 622 | 0.04 | 0.21 | 0.35 | 1.19 | 3.04 | |
| 790 | 0.03 | 0.23 | 0.43 | 1.18 | 2.72 | 0.01 |
| 957 | 0.01 | 0.27 | 0.51 | 1.29 | 3.04 | |

| White wall film, 6.5 gsm EVOH/PU barrier | | | | | | |
|---|---|---|---|---|---|---|
| Hrs@Temp | 40 C. | 60 C. | 70 C. | 80 C. | 90 C. | RT |
| 0 | 0 | 0 | 0 | 0 | 0 | 0 |
| 27 | 0 | 0.03 | 0 | 0 | | |
| 118 | 0.02 | 0 | 0 | 0 | 0 | |
| 285 | 0.01 | 0 | 0.05 | 0 | 0.27 | |
| 454 | 0.01 | 0 | 0.06 | 0.53 | 0.39 | |
| 622 | 0.01 | 0.02 | 0.19 | 0.44 | 0.33 | |
| 790 | 0.02 | 0 | 0.13 | 0.10 | 0.58 | 0 |
| 957 | 0.01 | 0.02 | 0.19 | 0.24 | 0.30 | |

| White wall film, no barrier coating | | | | | | |
|---|---|---|---|---|---|---|
| Hrs@Temp | 40 C. | 60 C. | 70 C. | 80 C. | 90 C. | RT |
| 0 | 0 | 0 | 0 | 0 | 0 | 0 |
| 27 | 0.91 | 6.69 | 10.6 | 18.01 | | |
| 118 | 2.95 | 7.71 | 11.78 | 18.02 | 21.16 | |
| 285 | 6.67 | 8.19 | 12.15 | 17.87 | 20.93 | |
| 454 | 3.89 | 8.35 | 12.31 | 17.24 | 19.88 | |
| 622 | 3.04 | 8.50 | 12.30 | 15.21 | 16.75 | |
| 790 | 3.08 | 8.54 | 12.35 | 14.72 | 14.08 | 0.34 |
| 957 | 3.10 | 8.65 | 12.37 | 14.58 | 14.09 | |

These test data show that the EVOH-based barrier coats produced resistance to color shift well within the 0.4 $\Delta b^*$ standard for up to 1000 hours accelerated color shift testing. Intercoat adhesion also was good without added tie coats.

EXAMPLE 4

Comparative tests were conducted on various test panels to measure time-related color change. The test panels are tested using a quick test method which starts with a wall film construction having a matte release layer, top coat and a white pigmented base coat. The film is placed in a vacuum holder and the barrier layer under test is coated on the base coat. The barrier coated film is dried at 70° C. oven temperature for five minutes. The barrier coat is laminated with a S-3506 PSA having a PET liner. The PET liner is then removed and a yellow dye coated PET film is laminated to the PSA. The finished construction is placed in an 80° C. oven for about twelve hours and color density on the white film is then measured by a color density instrument such as Tobias 1Q 150 to determine discoloration. The following test measurements illustrate color density for a yellow dye test at 90° C. for various time intervals. The test panels (identified as A through G) are shown in the following table:

| Yellow Dye Test (90° C.); Yellow Color Density | | | | | | | |
|---|---|---|---|---|---|---|---|
| Hours | A | B | C | D | E | F | G |
| 1 | 0 | 0 | 0 | 0 | 0 | 0.01 | 0.03 |
| 2 | 0 | 0 | 0 | 0 | 0.01 | 0.02 | 0.05 |
| 3 | 0 | 0 | 0 | 0 | 0.01 | 0.04 | 0.06 |
| 4 | 0 | 0 | 0 | 0 | 0.02 | 0.05 | 0.08 |
| 5.5 | 0 | 0 | 0 | 0 | 0.02 | 0.06 | 0.08 |
| 8.5 | 0 | 0 | 0 | 0 | 0.03 | 0.08 | 0.1 |
| 24 | 0 | 0 | 0 | 0 | | | |
| 48 | 0 | 0 | 0 | 0 | | | |
| 72 | 0-0.01 | 0 | 0-0.1 | 0.01 | | | |
| 144 | 0-.03 | 0 | 0-0.04 | 0.03 | | | |
| 168 | | | | | | | |
| 192 | | | | | 0.13 | 0.16 | 0.16 |
| 216 | 0-0.05 | 0 | 0-0.04 | 0.03 | | | |
| 264 | | | | 0.04 | 0.14 | 0.16 | 0.16 |
| 312 | 0.05 | 0.01 | 0.060 | | | | |
| Coat Wt. gsm | 2.4 | 5.2 | 2.2 | 2 | 3 | 2.8 | 0 |

A: 80 EVOH/20 PU; thermoplastic; no tie coats
B: 80 EVOH/20 PU; crosslinked with 3% Cymel, 10% Polyaziridine; tie coats used on opposite sides
C: 80 EVOH/20 PU; crosslinked with 5% Polyaziridine
D: EVOH only
E: 70 PU/30 PVA
F: Acrylic only and tie coat
G: No barrier

EXAMPLE 5

Lab test samples for measuring color density were cast and oven dried at 70° C. for five minutes. The wall films under test were similar to those described in the previous examples. In one series of tests, the barrier coat was applied by reverse comma coating techniques. The barrier coats consisted of 80% EVOH/20% PU, with 50 water/50 IPA solvent. In addition to a control sample having no barrier layer, yellow dye color density tests at 90° C. were conducted for samples having a variation of coat weights between about 2.2 to about 7.2 gsm, for barrier coats with the EVOH component having different levels of crosslinking, and for barrier coats having thermoplastic properties (no crosslinking). Test samples A, B and C in Example 3 show dye test results for these lab samples. Separate lab similar barrier materials were conducted by die coating techniques coated at 20 fpm and 40 fpm with zone temperatures at 165° F., 200° F., and 225° F. Lab tests also were conducted by reverse gravure coat techniques at 2 fpm, zone temperatures of 165° F., 200° F., and 225° F. with a solvent system of 50 water/34 IPA/16 n-butanol. These lab tests are summarized as follows:

(1) Addition of the barrier coat produces greatly improved resistance to color migration of the yellow pigments. Without a barrier, the tests showed that it takes only two hours at 90° C. to see yellowing to a color density of 0.02. Long-term resistance to yellow pigment migration also is improved when compared with barrier layers made of acrylic resin.

(2) Die coating techniques produced good film processing conditions. The addition of the n-butanol to replace some IPA improves processing when reverse gravure techniques were used. Gravure coating generally provides good film forming due to its thin layer.

(3) The higher the coat weight, the better the barrier properties on stopping yellow dye migration. However, higher coat weights can result in poor barrier film quality. A dry film coating thickness of the barrier from about 2.5 to about 4.5 microns produces good film quality High coat weights with lower solvent solutions can cause film shrinkage or blistering during drying. Better results are achieved with high coat weights and increased solids.

Tests were conducted on the same group of test panels to measure the effect of barrier layers on mechanical properties of the wall film. Comparative tests were conducted on a control sample (no barrier), and for 80% EVOH/20% PU films having a coat weight variation from 2.2 to 7.2 gsm, for films having a thermoplastic EVOH/PU barrier, and for EVOH/PU films having various levels of crosslinking. The test results generally showed improvements in stress (Young's modulus) and strain measurements for both films at various coat weights compared to lower measurements for the control film. One exception was a thermoplastic EVOH/PU film having a high coat weight (7.2 gsm). This test panel had a low stress measurement and excessively high elongation. Films having crosslinked EVOH/PU barrier coats produced good barrier properties, but film flexibility required for film handling and resistance to tearing was generally improved with films having thermoplastic EVOH/PU barrier layers which had better combinations of elongation and tensile strength (film toughness). In one embodiment good film flexibility and handling qualities are produced with films having an elongation to break of greater than 50%.

EXAMPLE 6

Tests were conducted on wall films similar to those described above, with barrier layers having various EVOH/urethane compositions, to determine surface energy and film performance, with the following results:

| EVOH/PU Blend Surface Energy and Performance | | | | | | |
|---|---|---|---|---|---|---|
| | | Surface Energy mN/m | | | Water Soak | Barrier |
| EVOH | PU | Dispersion | Polar | Total | Adhesion | Property |
| 100 | 0 | 29.7 | 5.2 | 34.9 | Poor | Good |
| 95 | 5 | 21.9 | 17.9 | 39.8 | Poor | Good |
| 90 | 10 | 22.5 | 20.3 | 42.8 | Fair | Good |
| 85 | 15 | 22.5 | 19.7 | 42.2 | Good | Good |
| 80 | 20 | 20.7 | 24.9 | 45.6 | Good | Good |
| 0 | 100 | 31.5 | 4.5 | 36 | Good | Poor |

These data show that during the coating process, the polyurethane emulsion tends to migrate to the surface, improving surface energy which tends to improve adhesion to the color layer and adhesion to the PSA layer. Film performance from the EVOH/PU barrier is improved generally with polyurethane contents greater than about 15%, and more specifically from about 15% to about 40%. Test data have shown best overall performance at a polyurethane content of approximately 20%.

EXAMPLE 7

Tests were conducted on wall film constructions with and without barrier coats. These tests measured peel values for the PSA layers, for films with a barrier layer and without a barrier layer. The test samples included 80% EVOH/20% PU barrier layers and an Avery Dennison PSA identified as AE-3506. Pigment to volume concentration (PVC) in the color coats refers to pigment volume with respect to total volume of non-volatile components in the formulation. Test samples were aged at room temperature and at 140° F. The peel tests were conducted on both stainless steel and on gray flat painted drywall. Peel tests were at 90° peel using a 10 lb. roller and 15 min. dwell time. In the test results to follow, peel units are in gm/in.

| Wall Film Barrier | Barrier Coat Stability Stainless Steel | | |
|---|---|---|---|
| | Pigment/Vol Concentration % | Room Temp. 1 week | Aged at 140° F. 1 week |
| No | 24.0 | 432 | 498 |
| Yes | 24.0 | 500 | 586 |
| No | 16.0 | 400 | 445 |
| Yes | 16.0 | 400 | 500 |
| No | 9.0 | 377 | 355 |
| Yes | 9.0 | 595 | 609 |

| Wall Film Barrier | Pigment/ Vol Concen- tration % | Flat Drywall | | | | |
|---|---|---|---|---|---|---|
| | | Room Temp. | | Aged at 140° F. | | |
| | | 1 week | 2 weeks | 1 week | 2 weeks | 3 weeks | 4 weeks |
| No | 24.0 | 368 | 364 | 259 | 239 | 218 | 245 |
| Yes | 24.0 | 341 | 323 | 286 | 355 | 332 | 318 |
| No | 16.0 | 350 | 332 | 245 | 214 | 186 | 264 |
| Yes | 16.0 | 332 | 418 | 368 | 408 | 373 | 323 |
| No | 9.0 | 345 | 368 | 204 | 133 | 164 | 114 |
| Yes | 9.0 | 354 | 359 | 327 | 350 | 359 | 336 |

Figure 4:
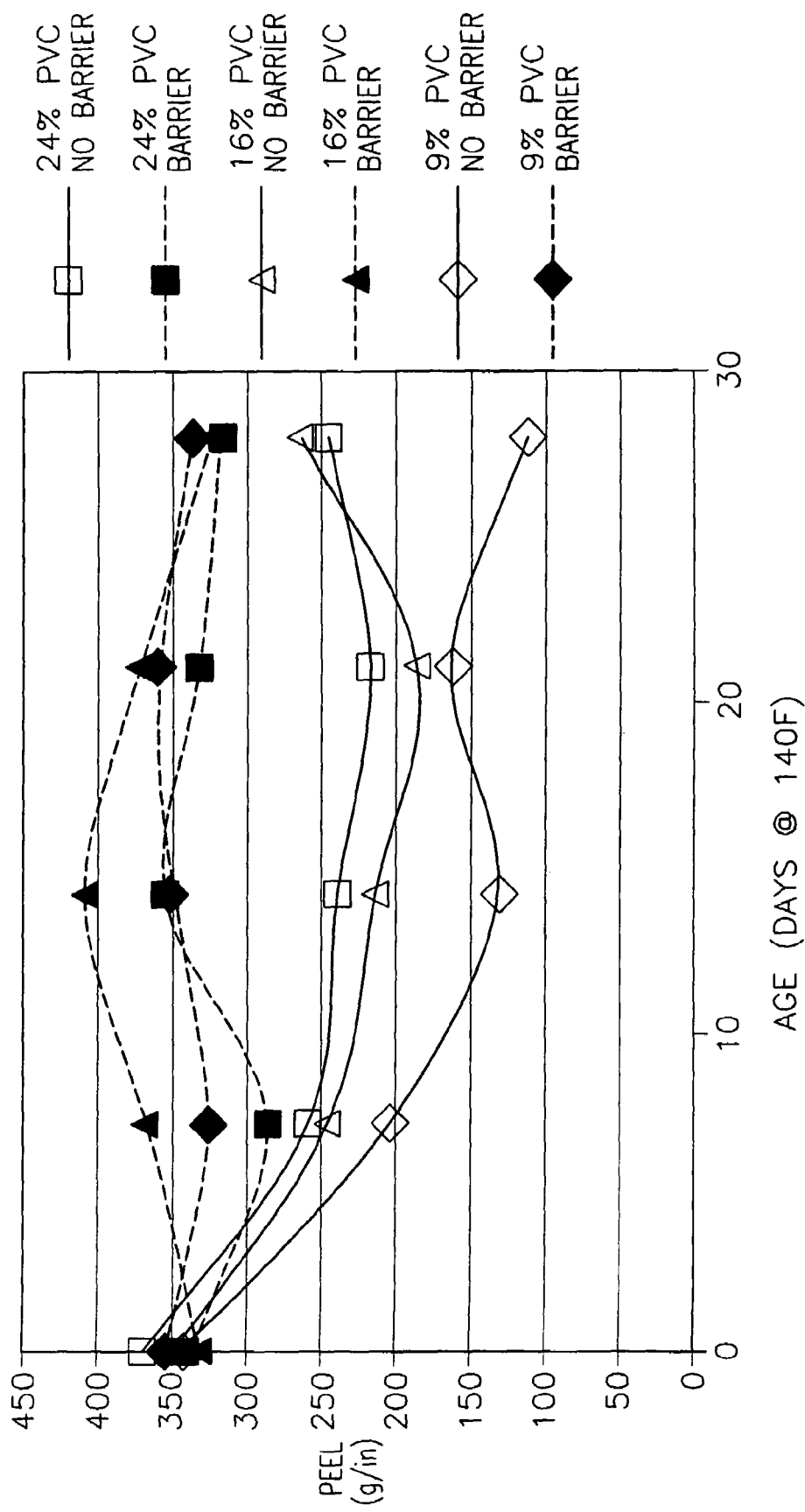
FIG. 4 is a graph which illustrates the data presented in Example 7.

These data are better illustrated in the graph shown in FIG. 4.

These test data generally show that addition of the wall film barrier provides consistently higher peel values compared with test samples having no barrier. The barrier appears to be effective in preventing migration of contaminants from the color layer to the adhesive layer. More specifically, the barrier appears to stop migration of constituents such as plasticizers and heat stabilizers from the color layer into the PSA layer, leaving the PSA layer more effective in its adhesive properties.

EXAMPLE 8

Lab tests were conducted to determine whether barrier properties and other mechanical properties of the decorative film can be maintained with EVOH barrier coats modified with polymeric resin additives other than the aliphatic polyurethane (Sancure 899) described previously. The following tests were conducted with a solid blue color coat similar to Example 1 (with a 24% pigment volume concentration) as the baseweb and 80% EVOH/20% polymer as the barrier coat. The control film was the same baseweb (clear coat, color coat, PSA) without the barrier coat. The thermoplastic forms of the barrier coats were tested.

| Barrier Material Type | Polymer | Yellow Dye Migration | 810 Tape Test | Tensile/elongation % Elongation |
|---|---|---|---|---|
| Baseweb | Control | poor | | 15 |
| Aliphalic polyester | Sancure 899 | good | good | 81 |
| Aromatic polyester | Sancure 1511 | good | good | 73 |
| Acrylic | Neocryl XK-90 | good | good | 62 |
| EVA | AirFlex 920 | good | good | 87 |

The 810 tape test is a single diagnostic adhesion test using about 4 inches of 3M 810 tape, pressing to the barrier coat and peeling quickly. If nothing peels off, adhesion is considered good.

These test results can be summarized as follows:

(1) Emulsion types of EVA, acrylic or aromatic polyester polyurethane can be used as EVOH barrier modifying materials in addition to the alphatic urethane.

(2) No yellow dye migration was observed (using the quick yellow dye test) after 4 days at 90° C.

(3) The barrier coat can dramatically increase the elongation/tensile (flexibility) of the baseweb at coat weights of about 5 to 6 gsm.

(4) All materials tested gave good adhesion to the color coat.

Tests on film tensile strength and Young's modulus show that at 16% pigment volume concentration, all variations of the barrier film produced tougher films when compared with the same baseweb having no barrier coat.

The present invention has been described with respect to multilayer laminates used as a wall film for interior architectural applications, but the laminate also is useful in other applications as well. These would include exterior architectural applications such as siding panels and wall surfaces; outdoor decorative items and signs; interior automotive decorative and functional uses such as dashboards and panels; and exterior automotive uses including automotive body parts, trim parts and panels.

What is claimed is:

1. A multi-layer decorative laminate for applying a layer of color to a substrate surface, the laminate comprising:
   a flexible decorative dry paint layer comprising a color layer which includes a resinous binder and a pigment;
   a pressure-sensitive adhesive layer overlying a surface of the decorative dry paint layer and adapted for adhering the laminate to a substrate surface; and
   a thin, flexible barrier layer disposed between the adhesive layer and the color layer, the barrier layer comprising an ethylene vinyl alcohol material forming a dry film form emulsion that retards migration of discoloration-causing pigments from a painted surface of the substrate through the adhesive layer to the color layer, said barrier layer having a thickness of less than about 0.25 mils.

2. The decorative laminate according to claim 1 in which the barrier layer produces a color shift of less than about 0.40 $\Delta b^*$ C.I.E. color units at 60° C. for 400 hours.

3. The decorative laminate according to claim 1 in which the barrier layer retards degradation of the adhesive layer caused by constituents migrating from the color layer toward the adhesive layer.

4. The decorative laminate according to claim 1 in which the barrier layer has a glass transition temperature ($T_g$) greater than about 50° C.

5. The decorative laminate according to claim 1 in which the barrier layer material inhibits migration of azo-type discoloration-causing pigments.

6. The decorative laminate according to claim 1 in which the barrier layer comprises an emulsion containing ethylene-vinyl alcohol blended with a dispersed polymeric material.

7. The decorative laminate according to claim 6 in which the dispersed polymeric material comprises a urethane material.

8. The decorative laminate according to claim 6 in which the barrier layer contacts both the pressure-sensitive adhesive layer and the color layer in the absence of separate adhesive tie layers.

9. The decorative laminate according to claim 6 in which the ethylene vinyl alcohol component is thermoplastic or crosslinked.

10. The decorative laminate according to claim 6 in which the dispersed polymeric material migrates to form a boundary layer on a side of the barrier layer.

11. A multi-layer decorative laminate for applying a layer of color to a substrate surface, the laminate comprising:
a flexible decorative dry paint layer comprising a color layer which includes a resinous binder and a pigment;
a pressure-sensitive adhesive layer overlying the decorative dry paint layer; and
a flexible barrier coat between the adhesive layer and the color layer, the barrier coat made from an emulsion of ethylene-vinyl alcohol copolymer and a migratory polymeric material in dry film form to provide a barrier layer as a stable emulsion with an internal boundary layer formed by the migratory polymeric material, the barrier layer and its internal boundary layer effective to inhibit migration of discoloration-causing azo-type pigments from a painted surface of the substrate through the adhesive layer to the color layer sufficiently to essentially prevent migrating pigments from a painted surface of the substrate from causing noticeable color change in the color layer under room temperature conditions, said barrier layer having a thickness of less than about 0.25 mils.

12. The decorative laminate according to claim 11 in which the migratory polymeric material comprises a urethane material.

13. The decorative laminate according to claim 11 in which the barrier layer emulsion is a thermoplastic or crosslinked material.

14. A multi-layer decorative wall film for applying a layer of color to a substrate surface, the wall film comprising:
a flexible decorative dry paint layer comprising a color layer which includes a resinous binder and a pigment;
a pressure-sensitive adhesive layer overlying a surface of the dry paint layer and adapted for adhering the wall film to a substrate surface;
a release liner overlying a surface of the dry paint layer opposite from the adhesive layer, the release liner removable from the dry paint layer for exposing an outer surface of the decorative dry paint layer when the pressure-sensitive adhesive layer adheres the wall film to the substrate surface and the release liner is peeled away from the decorative dry paint layer; and
a thin, flexible barrier layer disposed between the adhesive layer and the color layer, the barrier layer made from an ethylene-vinyl alcohol material that in dry film form inhibits migration of discoloration-causing pigments from a painted surface of the substrate through the adhesive layer to the color layer sufficiently to retard noticeable color change, caused by such pigments, from occurring in the color layer under room temperature conditions, said barrier layer having a thickness of less than about 0.25 mils.

15. The decorative wall film according to claim 14 in which the barrier layer material inhibits migration of azo-type discoloration-causing pigments.

16. The decorative wall film according to claim 14 in which the barrier layer comprises an emulsion containing ethylene-vinyl alcohol and a dispersed polymeric material.

17. The decorative wall film according to claim 16 in which the dispersed polymeric material is selected from the group which includes urethane, acrylic, polyester resins, ethylene vinyl acetate copolymer, and combinations thereof.

18. The decorative wall film according to claim 17 in which the barrier layer contacts both the pressure-sensitive adhesive layer and the color layer in the absence of separate adhesive tie layers.

19. The decorative wall film according to claim 14 in which the decorative dry paint layer has a dry film thickness from about 0.6 to about 1.6 mils to provide the decorative, protective and opacity properties sufficient to function as a wall paint.

20. A multi-layer decorative laminate for applying a layer of color to a substrate surface, the laminate comprising:
a flexible decorative dry paint layer comprising a color layer which includes a resinous binder and a pigment;
a pressure-sensitive adhesive layer overlying a surface of the decorative dry paint layer and adapted for adhering the laminate to a substrate surface;
a release liner overlying a surface of the decorative dry paint layer opposite from the adhesive layer, the release liner removable from the decorative dry paint layer for exposing an outer surface of the dry paint layer when the pressure-sensitive adhesive layer adheres the laminate to the substrate surface and the release liner is peeled away from the dry paint layer; and
a thin, flexible barrier layer disposed between the adhesive layer and the color layer, the barrier layer made from an ethylene-vinyl alcohol material that in dry film form inhibits migration of discoloration-causing azo-type pigments from a painted surface of the substrate through the adhesive layer to the color layer, in which the barrier layer produces a color shift of less than about 0.4 $\Delta b^*$ C.I.E. color units at 60° C. for 400 hours, said barrier layer having a thickness of less than about 0.25 mils.

21. The decorative laminate according to claim 20 in which the barrier layer comprises an emulsion containing ethylene-vinyl alcohol and a dispersed polymeric material that improves adhesion of the barrier layer to the adhesive layer and the color layer.

22. The decorative laminate according to claim 21 in which the dispersed polymeric material comprises a urethane material.

23. The decorative laminate according to claim 22 in which the barrier layer contacts both the pressure-sensitive adhesive layer and the color layer in the absence of separate adhesive tie layers.

24. A multi-layer decorative wall film for applying a layer of color to a substrate surface, the wall film comprising:
a flexible decorative dry paint layer comprising a color layer which includes a resinous binder and a pigment;
a decorative pressure-sensitive adhesive layer overlying a surface of the dry paint layer and adapted for adhering the wall film to a substrate surface; and
a thin, flexible barrier layer disposed between the adhesive layer and the color layer, the barrier layer comprising an emulsion of ethylene-vinyl alcohol copolymer and a dispersed urethane material in either a thermoplastic or crosslinked dry film form that reduces migration of discoloration-causing pigments from a painted surface of the substrate through the adhesive layer to the color layer, said barrier layer having a thickness of less than about 0.25 mils.

25. The decorative wall film according to claim 24 in which the barrier layer material inhibits migration of azo-type discoloration-causing pigments to an amount less than about $0.4\Delta b^*$ C.I.E. color units at 60° C. for 400 hours.

* * * * *

UNITED STATES PATENT AND TRADEMARK OFFICE
CERTIFICATE OF CORRECTION

| | | |
|---|---|---|
| PATENT NO. | : 7,727,607 B2 | Page 1 of 1 |
| APPLICATION NO. | : 11/707353 | |
| DATED | : June 1, 2010 | |
| INVENTOR(S) | : Frank Yen-Jer Shih et al. | |

It is certified that error appears in the above-identified patent and that said Letters Patent is hereby corrected as shown below:

<u>Column 19</u>

Line 49, after the word lab, insert --tests for--.

Signed and Sealed this
Tenth Day of May, 2011

David J. Kappos
*Director of the United States Patent and Trademark Office*